(12) United States Patent
Miller et al.

(10) Patent No.: US 10,670,878 B2
(45) Date of Patent: Jun. 2, 2020

(54) CAMERA LENS SUSPENSIONS

(71) Applicant: Hutchinson Technology Incorporated, Hutchinson, MN (US)

(72) Inventors: Mark A. Miller, Hutchinson, MN (US); Donald M. Anderson, Hutchinson, MN (US); Ryan N. Ruzicka, Waconia, MN (US); Peter F. Ladwig, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/599,449

(22) Filed: May 18, 2017

(65) Prior Publication Data

US 2017/0336646 A1 Nov. 23, 2017

Related U.S. Application Data

(60) Provisional application No. 62/338,823, filed on May 19, 2016.

(51) Int. Cl.
*G02B 27/64* (2006.01)
*H04N 5/232* (2006.01)
(Continued)

(52) U.S. Cl.
CPC ............ *G02B 27/64* (2013.01); *F03G 7/065* (2013.01); *G02B 7/08* (2013.01); *G03B 3/10* (2013.01);
(Continued)

(58) Field of Classification Search
CPC ........... F03G 7/06; G02B 27/64; G02B 13/24; G02B 7/09; G02B 27/646; G02B 7/023
See application file for complete search history.

(56) References Cited

U.S. PATENT DOCUMENTS 3,587,432 A 6/1971 Koch
3,734,386 A 5/1973 Hazel
(Continued)

FOREIGN PATENT DOCUMENTS

CN 101668947 A 3/2010
CN 101876742 A 11/2010
(Continued)

OTHER PUBLICATIONS

Extended European Search Report in European Application No. 16762309.9, dated Aug. 1, 2018.
(Continued)

*Primary Examiner* — Clayton E. LaBalle
*Assistant Examiner* — Linda B Smith
(74) *Attorney, Agent, or Firm* — DLA Piper LLP (US)

(57) ABSTRACT

An assembly includes a support structure including attach structures. The suspension assembly includes a moving structure including attach structures and flexure arms configured to couple the moving structure to the support structure, the flexure arms are configured to enable movement of the moving structure with respect to the support structure. The suspension assembly includes optical-image stabilizer shape memory alloy wires, each coupled with and extending between one of the attach structures and one of the moving wire attach structures. The suspension assembly includes a lens holder mounted to the moving structure and a first pair of attach structures; and auto focus shape memory alloy wires, each wire coupled to the lens holder and coupled to and extending between attach structures of the first pair of attach structures configured to actuate the lens holder with respect to the moving structure.

13 Claims, 28 Drawing Sheets

(51) Int. Cl.
  *G02B 7/08* (2006.01)
  *H04N 5/225* (2006.01)
  *F03G 7/06* (2006.01)
  *G03B 3/10* (2006.01)
  *G03B 5/00* (2006.01)

(52) U.S. Cl.
  CPC .............. *G03B 5/00* (2013.01); *H04N 5/2254* (2013.01); *H04N 5/232* (2013.01); *H04N 5/23287* (2013.01); *G03B 2205/0007* (2013.01); *G03B 2205/0076* (2013.01)

(56) References Cited

U.S. PATENT DOCUMENTS

| | | |
|---|---|---|
| 3,776,447 A | 12/1973 | Simmons et al. |
| 4,140,265 A | 2/1979 | Morino |
| 4,437,603 A | 3/1984 | Kobayashi et al. |
| 4,781,319 A | 11/1988 | Deubzer et al. |
| 4,984,581 A | 1/1991 | Stice |
| 5,477,463 A | 12/1995 | Tamura |
| 5,513,917 A | 5/1996 | Ide et al. |
| 5,831,820 A | 11/1998 | Huang |
| 5,840,417 A | 11/1998 | Bolger |
| 6,149,742 A | 11/2000 | Carpenter et al. |
| 6,279,215 B1 | 8/2001 | Nomoto |
| 6,916,115 B1 | 7/2005 | Vallance et al. |
| 7,384,531 B1 | 6/2008 | Peltoma et al. |
| 7,388,733 B2 | 6/2008 | Swanson et al. |
| 7,679,647 B2 | 3/2010 | Stavely et al. |
| 7,929,252 B1 | 4/2011 | Hentges et al. |
| 8,144,430 B2 | 3/2012 | Hentges et al. |
| 8,169,746 B1 | 5/2012 | Rice et al. |
| 8,218,958 B2 | 7/2012 | Sato |
| 8,350,959 B2 | 1/2013 | Topliss et al. |
| 8,388,773 B2 | 3/2013 | Luntz et al. |
| 8,421,908 B2 | 4/2013 | Kosaka et al. |
| 8,570,384 B2 | 10/2013 | Brown |
| 8,602,665 B2 | 12/2013 | Kamatani et al. |
| 8,848,064 B2 | 9/2014 | Topliss et al. |
| 8,885,299 B1 | 11/2014 | Bennin et al. |
| 9,175,671 B2 | 11/2015 | Howarth |
| 9,366,879 B1 | 6/2016 | Miller |
| 9,454,016 B1 | 9/2016 | Ladwig et al. |
| 9,479,699 B2 | 10/2016 | Brown et al. |
| 9,541,769 B2 | 1/2017 | Ladwig et al. |
| 10,036,897 B2 | 7/2018 | Ladwig et al. |
| 10,067,357 B2 | 9/2018 | Ladwig et al. |
| 10,139,647 B2 | 11/2018 | Miller |
| 2004/0036479 A1 | 2/2004 | Thomsen |
| 2005/0115235 A1 | 6/2005 | Mernoe |
| 2008/0183257 A1 | 7/2008 | Imran et al. |
| 2008/0231955 A1 | 9/2008 | Otsuka |
| 2009/0295986 A1 | 12/2009 | Topliss et al. |
| 2010/0074607 A1 | 3/2010 | Topliss et al. |
| 2010/0074608 A1* | 3/2010 | Topliss ................... G03B 3/10 396/133 |
| 2010/0119863 A1 | 5/2010 | Bogursky et al. |
| 2011/0249131 A1 | 10/2011 | Topliss et al. |
| 2012/0154614 A1* | 6/2012 | Moriya .................... G03B 3/10 348/208.5 |
| 2012/0174574 A1 | 7/2012 | Kotanagi et al. |
| 2013/0016427 A1* | 1/2013 | Sugawara ................ G02B 7/08 359/557 |
| 2013/0169092 A1 | 7/2013 | Neuhaus et al. |
| 2013/0221071 A1 | 8/2013 | Kim et al. |
| 2013/0222685 A1* | 8/2013 | Topliss ................. G02B 27/646 348/373 |
| 2013/0292856 A1 | 11/2013 | Braun et al. |
| 2013/0300880 A1 | 11/2013 | Brown et al. |
| 2013/0338730 A1 | 12/2013 | Shiroff et al. |
| 2014/0055630 A1* | 2/2014 | Gregory .................. G03B 3/02 348/208.2 |
| 2015/0068013 A1 | 3/2015 | Galu, Jr. |
| 2015/0135703 A1 | 5/2015 | Eddington et al. |
| 2015/0304561 A1* | 10/2015 | Howarth .............. G02B 27/646 348/374 |
| 2015/0346507 A1 | 12/2015 | Howarth |
| 2015/0365568 A1 | 12/2015 | Topliss et al. |
| 2016/0154252 A1 | 6/2016 | Miller et al. |
| 2016/0227088 A1 | 8/2016 | Brown et al. |
| 2016/0258425 A1 | 9/2016 | Ladwig et al. |
| 2016/0259178 A1 | 9/2016 | Miller |
| 2016/0263889 A1 | 9/2016 | Hamaguchi et al. |
| 2016/0294141 A1 | 10/2016 | Davis et al. |
| 2017/0131562 A1 | 5/2017 | Ladwig et al. |
| 2017/0160559 A1 | 6/2017 | Ladwig et al. |
| 2017/0219842 A1* | 8/2017 | Howarth ................ G02B 27/48 |
| 2017/0357076 A1 | 12/2017 | Scheele et al. |
| 2018/0373056 A1 | 12/2018 | Ladwig et al. |

FOREIGN PATENT DOCUMENTS

| | | | |
|---|---|---|---|
| CN | 102089695 A | 6/2011 | |
| EP | 1 870 962 A2 | 12/2007 | |
| EP | 2 732 331 A1 | 5/2014 | |
| WO | WO-2010089526 A2 * | 8/2010 | ............. F03G 7/065 |
| WO | WO 2013/153400 A2 | 10/2013 | |
| WO | WO 2013/175197 A1 | 11/2013 | |
| WO | WO 2014/076463 A1 | 5/2014 | |
| WO | WO 2014/083318 A1 | 6/2014 | |
| WO | WO 2015/132571 A1 | 9/2015 | |
| WO | WO 2016/009200 A1 | 1/2016 | |

OTHER PUBLICATIONS

Office Action in U.S. Appl. No. 14/956,612, dated Aug. 9, 2018.
Office Action in U.S. Appl. No. 15/063,151, dated Jul. 26, 2018.
Notice of Allowance in U.S. Appl. No. 15/156,545, dated Jul. 26, 2018.
International Preliminary Report on Patentability in International Application No. PCT/US2017/033517, dated Nov. 29, 2018.
Office Action in Chinese Application No. 201680025323.3, dated Dec. 28, 2018.
International Preliminary Report on Patentability in International Application No. PCT/US2017/036884, dated Dec. 20, 2018.
Office Action in U.S. Appl. No. 15/618,917, dated Jan. 11, 2019.
International Search Report and Written Opinion in International Application No. PCT/US2015/062576, dated Mar. 2, 2016.
International Preliminary Report on Patentability in International Application No. PCT/US2015/062576, dated Jun. 15, 2017.
Extended European Search Report in European Application No. 15866032.4, dated Mar. 22, 2018.
International Search Report and Written Opinion in International Application No. PCT/US2015/062713, dated Mar. 2, 2016.
International Preliminary Report on Patentability in International Application No. PCT/US2015/062713, dated Jun. 15, 2017.
Extended European Search Report in European Application No. 15864743.8, dated Mar. 22, 2018.
International Search Report and Written Opinion in International Application No. PCT/US2015/063363, dated Feb. 12, 2016.
International Preliminary Report on Patentability in International Application No. PCT/US2015/063363, dated Jun. 15, 2017.
Extended European Search Report in European Application No. 15865383.2, dated Mar. 22, 2018.
International Search Report and Written Opinion in International Application No. PCT/US2016/021230, dated Jun. 3, 2016.
International Preliminary Report on Patentability in International Application No. PCT/US2016/021230, dated Sep. 21, 2017.
International Search Report and Written Opinion in International Application No. PCT/US2017/033517, dated Aug. 4, 2017.
International Search Report and Written Opinion in International Application No. PCT/US2017/036884, dated Oct. 19, 2017.
International Search Report and Written Opinion in International Application No. PCT/US2015/066939, dated Mar. 14, 2016.
International Search Report and Written Opinion in International Application No. PCT/US2016/025194, dated Jun. 30, 2016.
International Search Report and Written Opinion in International Application No. PCT/US2016/054274, dated Dec. 13, 2016.

(56) References Cited

OTHER PUBLICATIONS

Office Action in U.S. Appl. No. 14/956,612, dated Jan. 4, 2018.
Office Action in U.S. Appl. No. 15/063,151, dated Feb. 21, 2018.
Office Action in U.S. Appl. No. 15/156,545, dated May 8, 2017.
Office Action in U.S. Appl. No. 15/156,545, dated Dec. 26, 2017.
Office Action in U.S. Appl. No. 15/276,115, dated Sep. 18, 2017.
Notice of Allowance in U.S. Appl. No. 15/276,115, dated Mar. 26, 2018.
Corrected Notice of Allowance in U.S. Appl. No. 15/276,115, dated Jul. 3, 2018.
Office Action in U.S. Appl. No. 15/400,516, dated Sep. 21, 2017.
Office Action in U.S. Appl. No. 15/400,516, dated Dec. 15, 2017.
Notice of Allowance in U.S. Appl. No. 15/400,516, dated May 4, 2018.
Extended European Search Report in European Patent Application No. 17800231.7, dated Dec. 9, 2019.

* cited by examiner

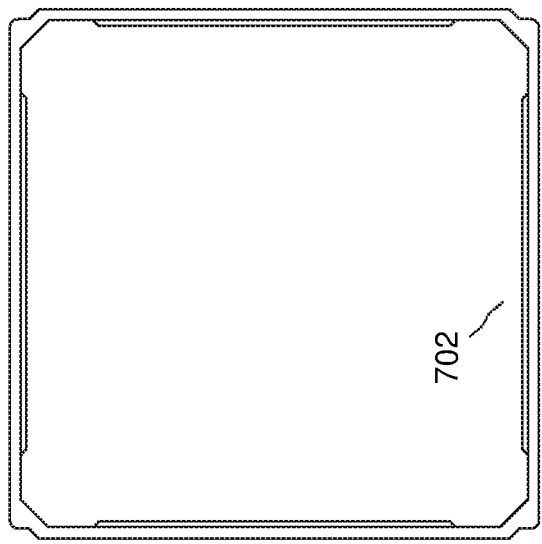
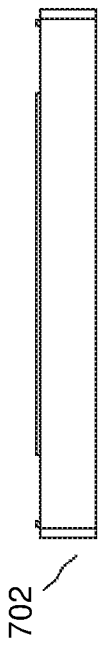
Figure 14
Figure 15

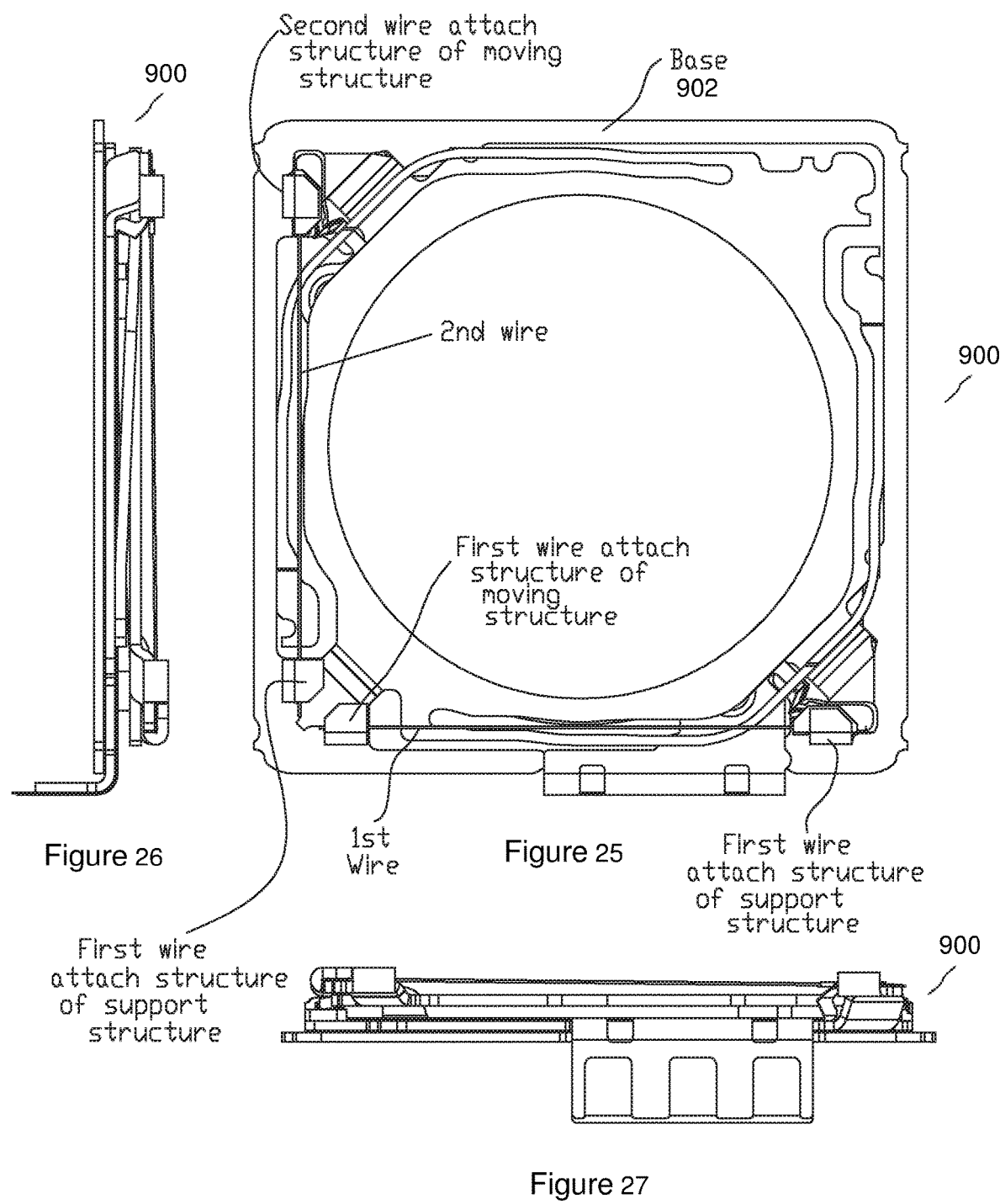

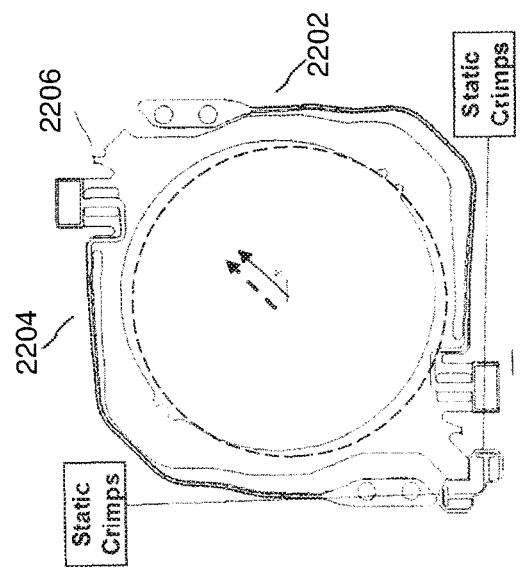
Figure 31C
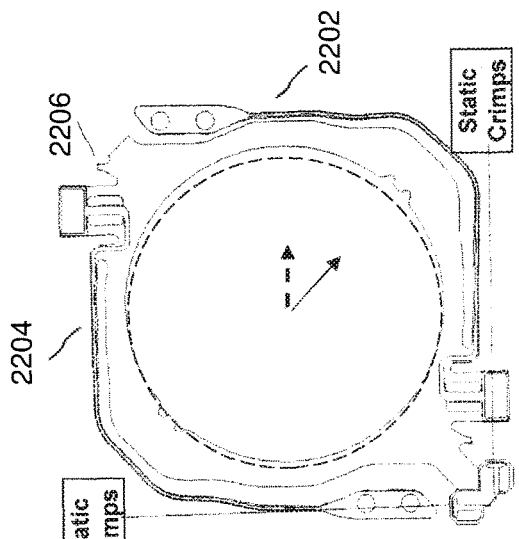
Figure 31D
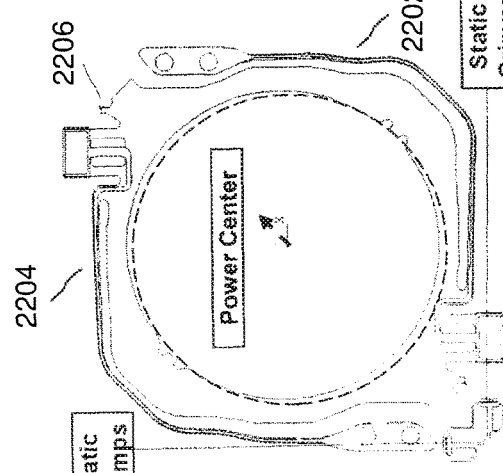
Figure 31B
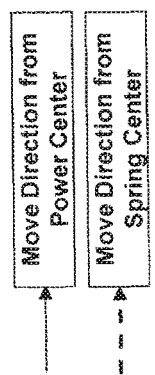
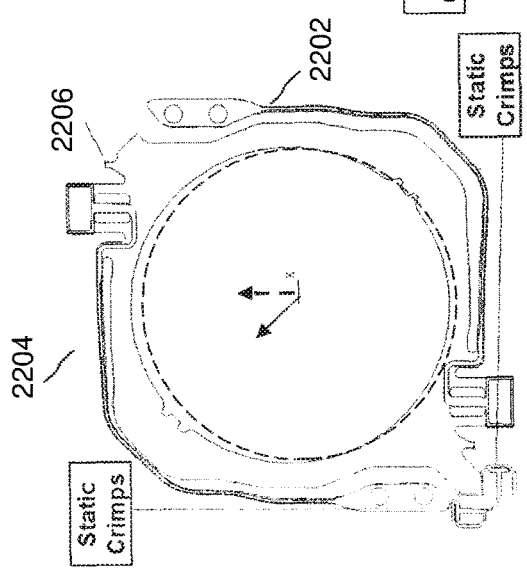
Figure 31A
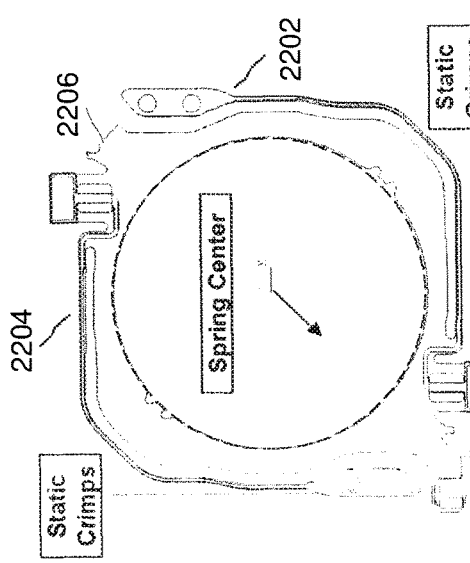
Figure 31E

US 10,670,878 B2

CAMERA LENS SUSPENSIONS

CROSS-REFERENCE TO RELATED APPLICATIONS

This application claims priority from U.S. Provisional Patent Application No. 62/338,823, filed on May 19, 2016, which is hereby incorporated by reference in its entirety.

FIELD

Embodiments of the invention relate generally to camera lens suspensions such as those incorporated into mobile phones, tablets and wearable body cameras.

BACKGROUND

Camera lens optical image stabilization (OIS) suspension systems are generally known and disclosed, for example, in the following patent documents: U.S. Pat. Nos. 8,570,384 and 8,848,064; Published U.S. Patent Applications 2012/0154614 and 2014/0055630; PCT International Application Publications WO 2016/009200, WO 2014/083318 and WO 2013/175197. All of the above-identified patent documents are incorporated herein by reference in their entireties and for all purposes.

Suspension systems of these types have a moving assembly or structure (to which a camera lens element, including optionally an auto-focusing drive, can be mounted) supported by a flexure element or spring plate on a stationary support structure that may include a base. The systems may be enclosed by a structure such as a screening can. The moving assembly is supported for movement on the support assembly by a bearing such as plural balls or plural slide bearings of low friction. The flexure element, which is formed from metal such as phosphor bronze or stainless steel, has a moving plate and flexures. The flexures extend between the moving plate and the stationary support assembly and function as springs to enable the movement of the moving assembly with respect to the stationary support assembly. The balls allow the moving assembly to move with little resistance. The moving assembly and support assembly are coupled by four shape memory alloy (SMA) wires extending between the assemblies. Each of the SMA wires has one end attached to the support assembly, and an opposite end attached to the moving assembly. The suspension is actuated by applying electrical drive signals to the SMA wires.

There remains a continuing need for improved lens suspensions. Suspension structures of these types that are highly functional, relatively thin or low profile, robust and efficient to manufacture would be particularly desirable.

SUMMARY

A suspension assembly is described. The suspension assembly includes a support structure including one or more support wire attach structures. The suspension assembly further includes a moving structure including one or more moving wire attach structures. The suspension assembly also includes one or more flexure arms configured to couple the moving structure to the support structure, wherein the flexure arms are configured to enable movement of the moving structure with respect to the support structure. Moreover, the suspension assembly includes one or more optical-image stabilizer shape memory alloy wires, each of the one or more optical-image stabilizer shape memory wires coupled with and extending between one of the support wire attach structures and one of the moving wire attach structures. The suspension assembly includes a lens holder movably mounted to the moving structure. The suspension assembly includes at least a first pair of auto focus shape memory alloy wire attach structures; and one or more auto focus shape memory alloy wires, each auto focus shape memory alloy wire coupled to the lens holder and coupled to and extending between the auto focus wire attach structures of one of the at least first pair of auto focus wire attach structures configured to actuate the lens holder with respect to the moving structure.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIGS. 7-24 illustrate an OIS assembly including a screening can assembly and methods according to various embodiments;

FIG. 25-30 illustrate a two-wire camera lens optical image stabilization ("OIS") suspension assembly 900 according to various embodiments;

FIG. 31A-31E illustrate the operation or actuation of the suspension assembly according to an embodiment.

DETAILED DESCRIPTION

Figure 1:
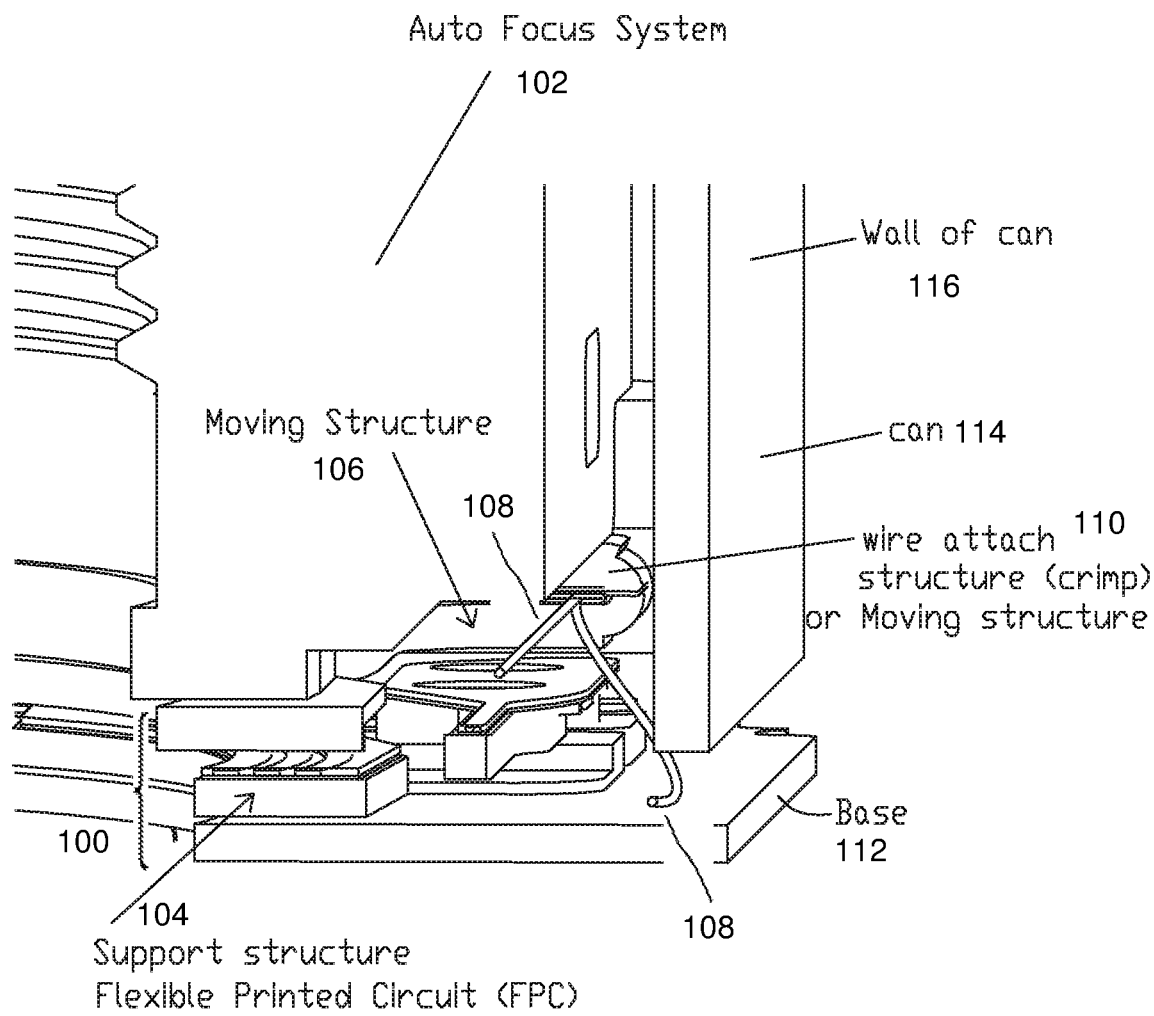
FIG. 1 illustrate a prior art camera lens optical image stabilization system.
Figure 2:
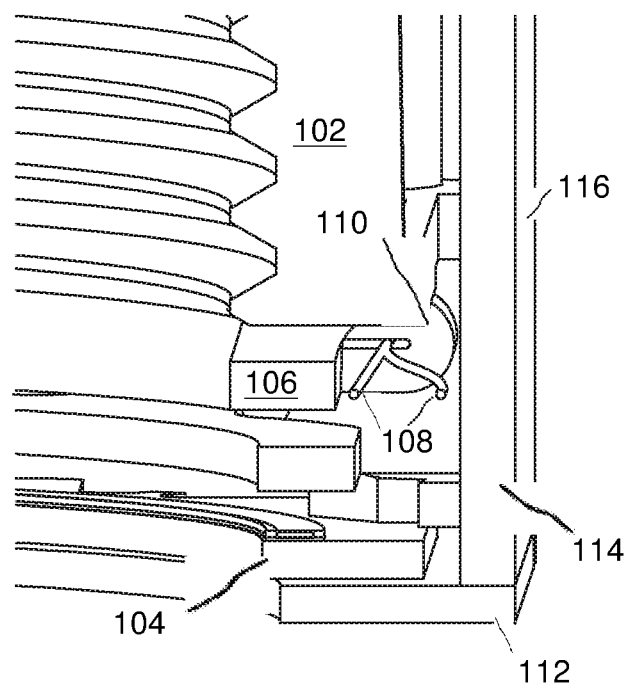
FIG. 2 illustrate a prior art camera lens optical image stabilization system.
Figure 3:
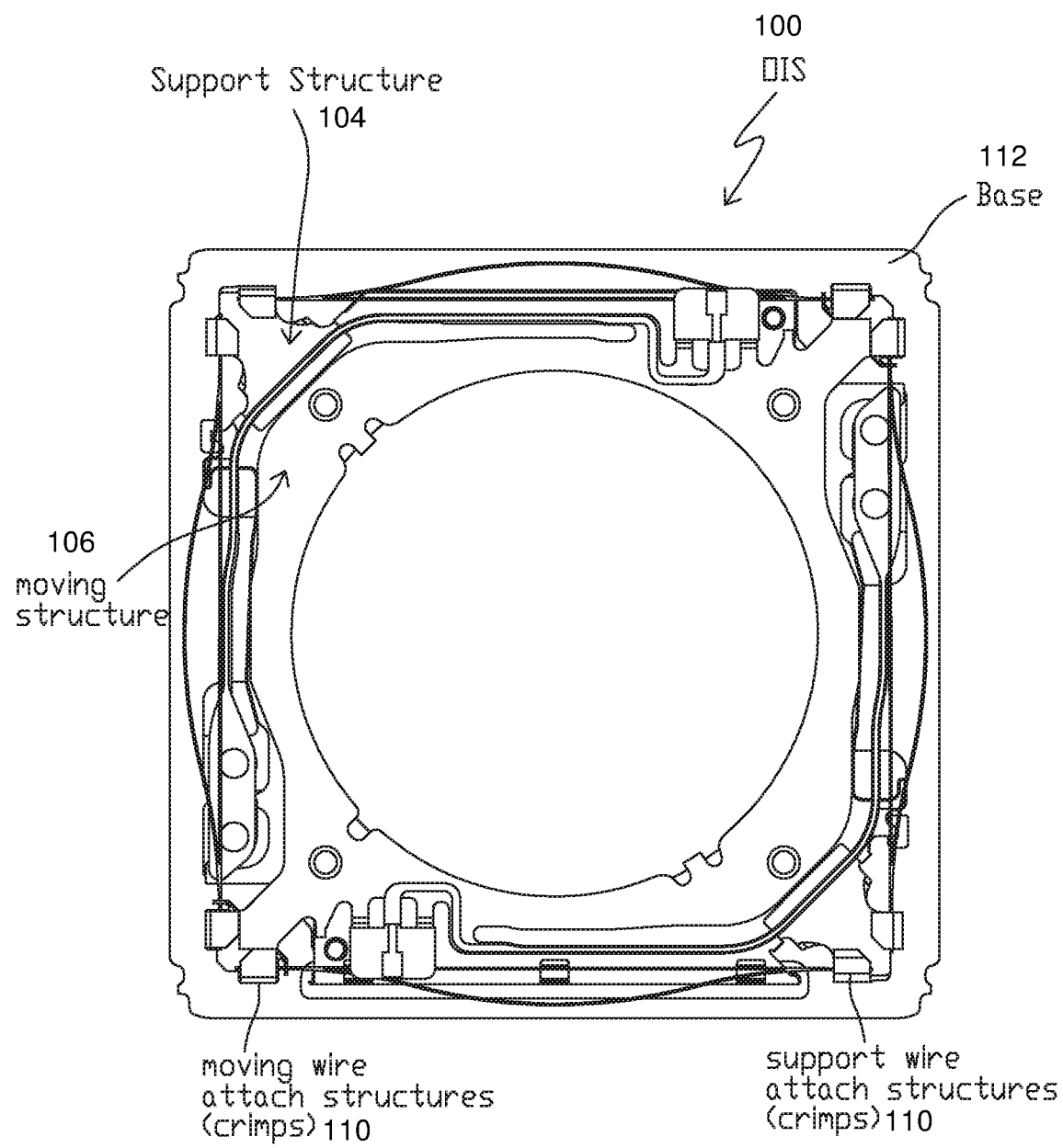
FIG. 3 illustrate a prior art camera lens optical image stabilization system.

FIGS. 1-3 illustrate a prior art camera lens optical image stabilization ("OIS") system. As shown in FIGS. 1 and 2, the OIS system also has an auto focus (AF) system 102 mounted to the OIS system 100. As shown, the OIS system 100 as an assembly includes a static or support structure 104 and a moving structure 106. Shape memory alloy wires extend along the sides of the assembly between corresponding wire attach structures 110 (crimps in the illustrated embodiments) on the support structure 104 and the moving structure 106. The assembly is mounted to a base 112 and the sides are enclosed by a can 114 having sidewalls 116.

During operation of the OIS system, electrical signals are applied to the wires 108, causing the wires to be heated and to move or actuate the moving structure 106 with respect to the support structure 104. When the wires 108 are not powered and cold, and for example during assembly of the system, the wires 108 can be baggy or slack. During assembly, and as shown for example in FIG. 1, the slack wires can extend beyond the sides of the assembly to the locations that the sidewalls 116 of the can 114 engage the base 112. To prevent damage to the wires 108 during assembly, they are moved inwardly toward the assembly to provide appropriate clearance for the sidewalls 116 of the can 114 to engage the base 112 without damaging the wire. The wires 108 can be powered and heated during assembly, for example, to tighten them and reduce the risk that they are pinched or damaged during assembly. However, there still is the risk of damaging the wires. In addition, the extra assembly steps result in a more complex assembly procedure which can add to the cost of the camera lens optical image stabilization system and slow down the assembly process.

Integrated Auto Focus (AF) and OIS Actuators

Figure 4:
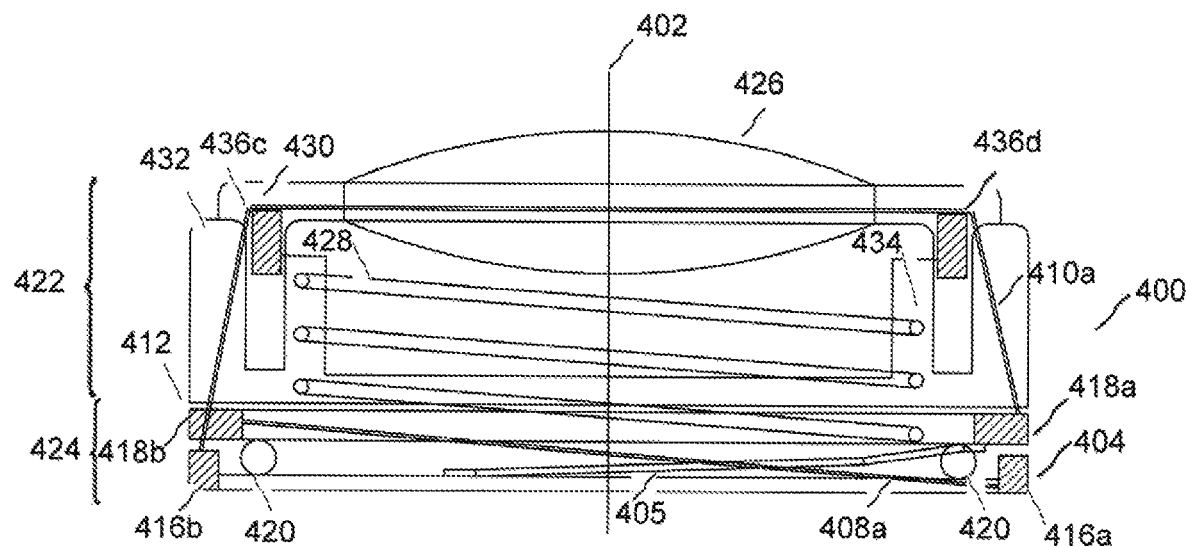
FIG. 4 illustrates first side view of a suspension assembly that integrates AF and OIS actuator assemblies according to an embodiment.
Figure 5:
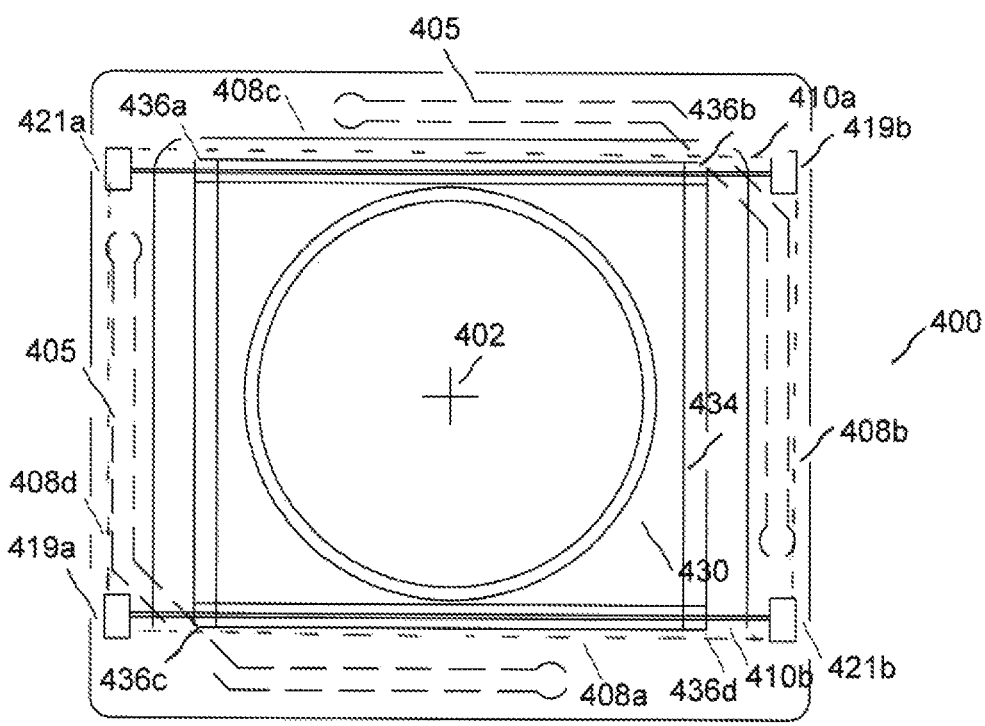
FIG. 5 illustrates a top view of a suspension assembly that integrates AF and OIS actuator assemblies according to an embodiment.
Figure 6:
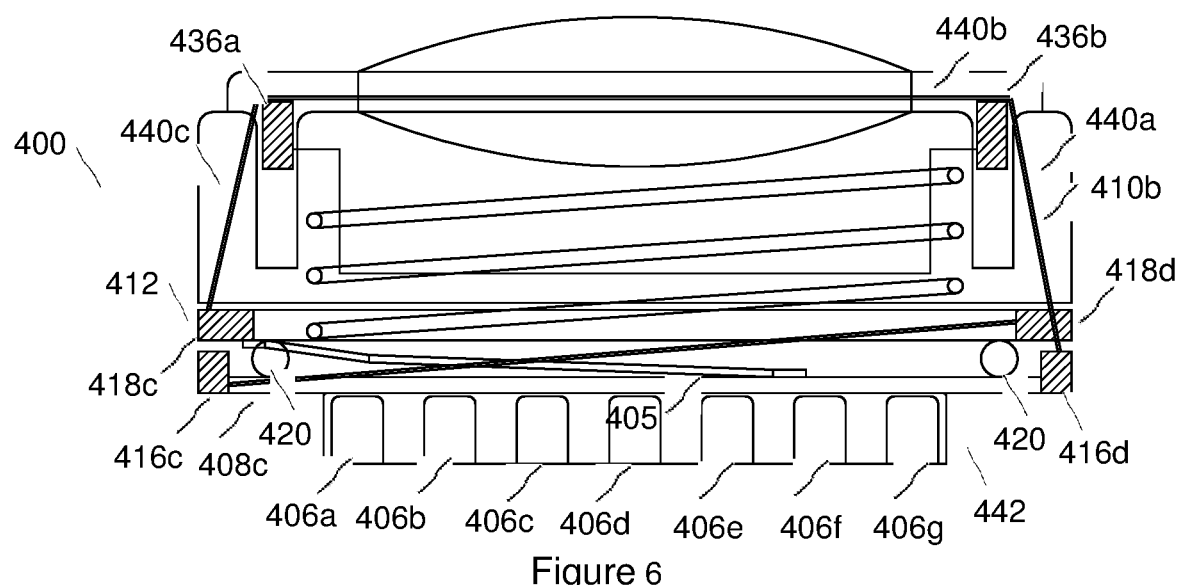
FIG. 6 illustrates a second side view of a suspension assembly that integrates AF and OIS actuator assemblies according to an embodiment.
Figure 7:
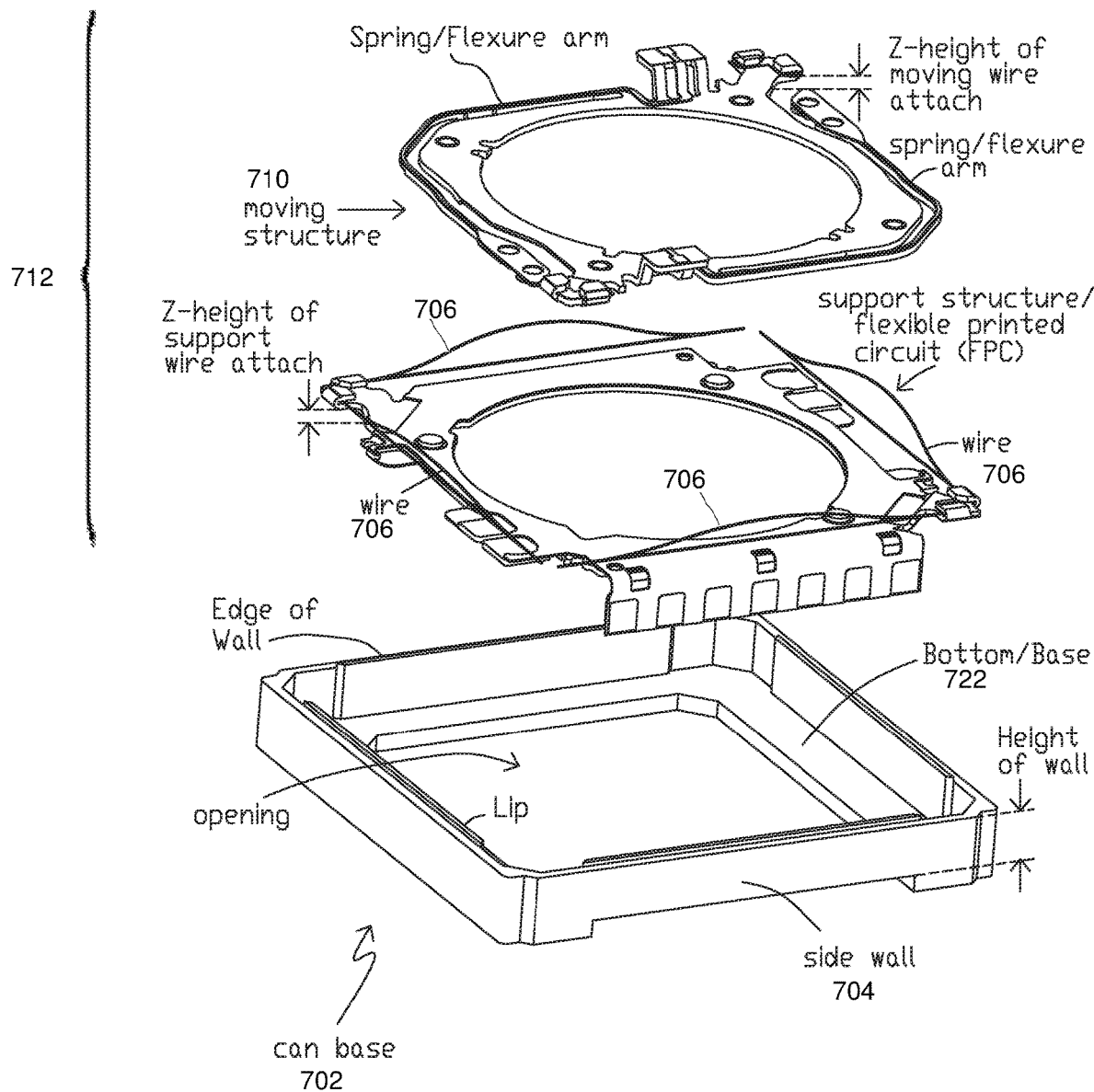
Figure 8:
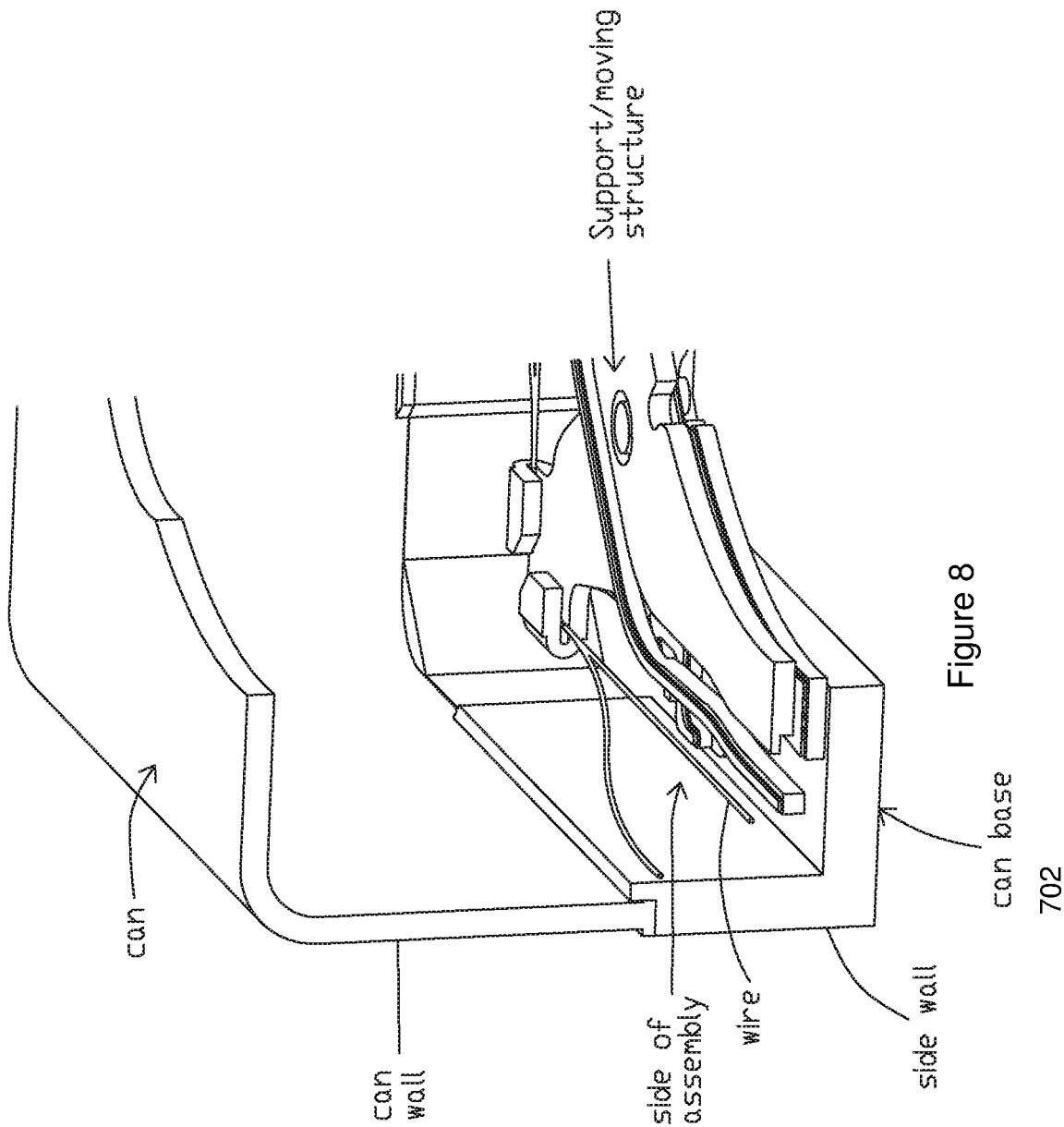
Figure 9:
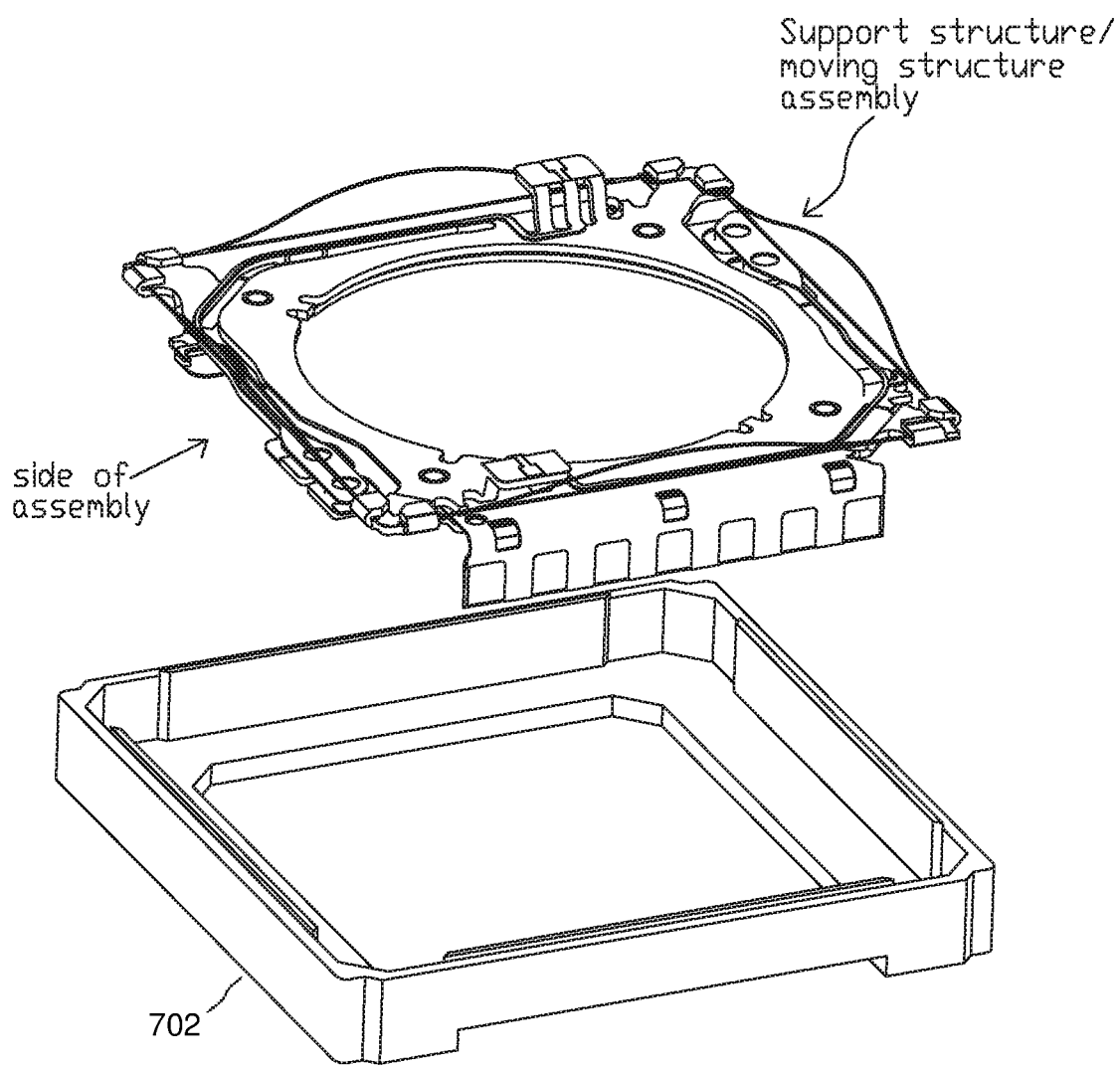
Figure 10:
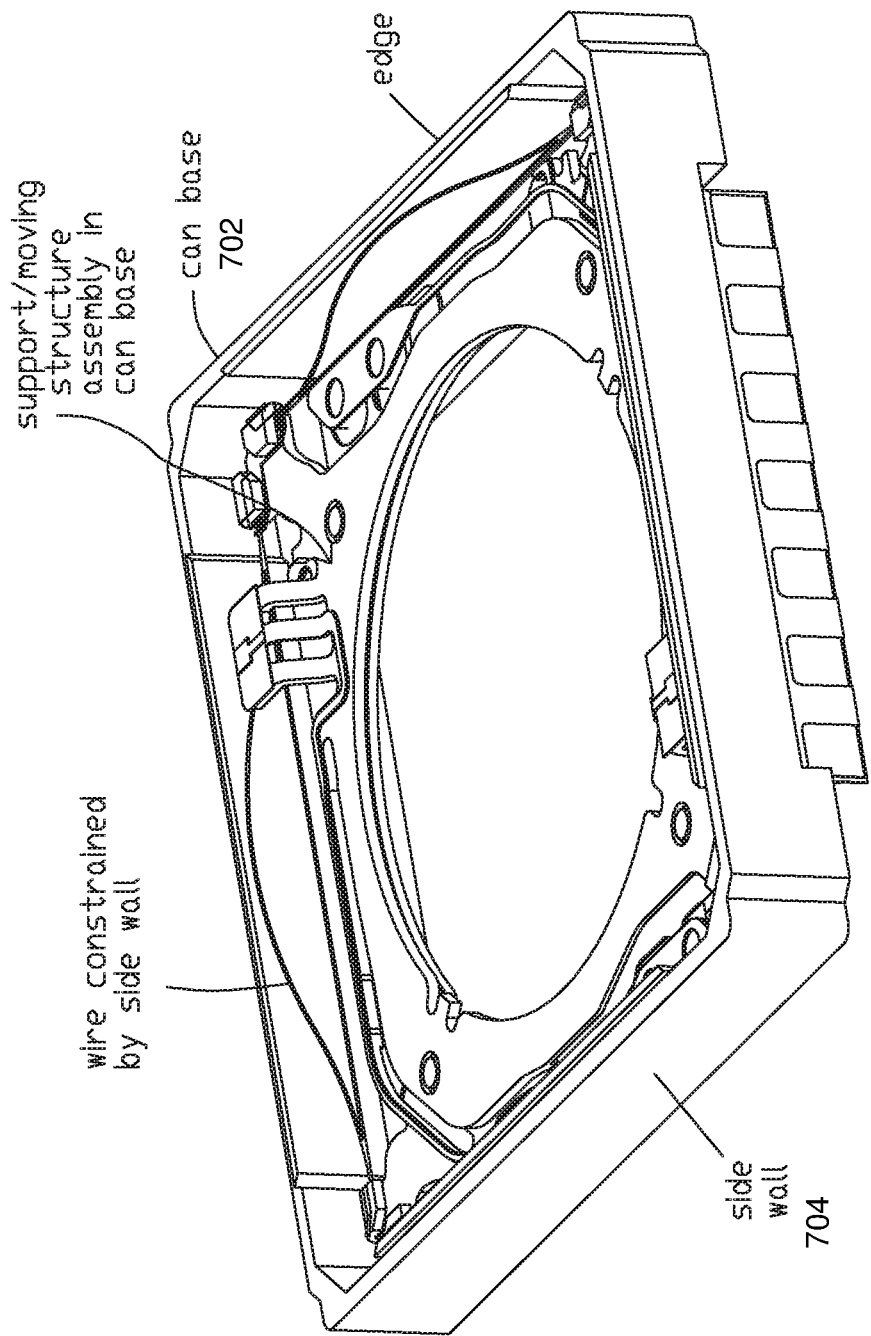

FIGS. 4-6 illustrate embodiments of a suspension assembly that integrates auto-focus ("AF") and optical-image-stabilizer ("OIS") actuator assemblies that are aligned along a common central-optical axis of a device such as a camera lens actuator. In particular, FIG. 4 illustrates first side view of a suspension assembly that integrates AF and OIS actuator assemblies according to an embodiment. FIG. 5 illustrates a top view of a suspension assembly that integrates AF and OIS actuator assemblies according to an embodiment. FIG. 6 illustrates a second side view of a suspension assembly that integrates AF and OIS actuator assemblies according to an embodiment. According to various embodiments, an OIS assembly 424 has two layers. A support structure, such as a FPC (static) layer 404, has an external connection 442. For some embodiments, the external connection 442 includes seven external connection portions 406a-g configured to electrically couple with four OIS shape memory alloy ("SMA") wires 408a-d, of the OIS assembly 424, the two AF SMA wires 410 a,b of the AF and to a common ground of the OIS SMA wires 408a-d and the AF SMA wires 410a,b. The flexible printed circuit ("FPC") layer 404 is connected to the moving (spring) layer 412 positioned above the FPC layer 404 through spring arms or flexure arms 405 in the moving layer 412 that are attached to the FPC layer 404 and by four OIS SMA wires 408a-d, each one on a separate side of the suspension assembly 400, each attached, such as crimps, on one end to a wire attach structure, such as a FPC layer crimp 416a-d and on its other end to a moving layer crimp 418a-d in the moving layer 412. Bearings 420 are provided between the moving layer 412 and the FPC layer 404. According to various embodiments, a plurality of bearings of bearings 420, for example 3 or more, are used to provide spacing and smooth lateral x-y movement of the moving layer 412 relative to the FPC layer 404 and perpendicular to the optical axis 402 when the OIS SMA wires 408a-d are actuated. However, any number of bearings 420 may be used.

The AF assembly 422 is positioned above the moving layer 412 and is connected to both the moving layer 412 and FPC layer 404 by two AF SMA wires 410a,b each on opposing sides of the suspension assembly 400 and connected to a lower crimp 421a, b of the FPC layer 404 on one end and to an upper crimp 419a,b of the moving layer 412 on its other end. According to various embodiments, the AF SMA wire attach structures, such as crimps 421, 419, used to attach the AF SMA wires 410a,b of the AF assembly 422 are separate from the crimps 416, 418 used to crimp the four SMA wires 408a-d of the OIS assembly 424. The AF assembly 424, according to some embodiments, includes an AF outer housing 432 that can be made of plastic and that encloses all or portions of the AF assembly components, including the lens 426, AF SMA wires 410a,b, a lens holder, such as a bobbin 430, and spring 428. A top portion of the housing 432 provides channels 434 or guides for positioning and attaching a bobbin 430. The bobbin 430, which can be plastic, holds the lens 426 in a centered position along the optical axis 402 and includes a bobbin spring 428, to move or shift the lens 426 along the optical axis 402 (for example, the z-axis) when the AF SMA wires 410a,b are actuated. Each of the two AF SMA wires 410 a,b has a first portion 440a and second portion 440c each extending from a crimp in the z-direction and at an angle towards the optical axis 402. The first portion 440a and second portion 440c transition at a structure to guide a SMA wire, such as hook structure 436a-d formed in the bobbin 430, into a third portion 440b of wire that is between the first portion 440a and second portion 440c and extends perpendicular to the optical axis 402 (or parallel to the OIS assembly layers). The hook structures 436a-d maintain the wire yet do not interfere with the movement of the AF SMA wires 410a,b when actuated, meaning the hook structures 436a-d are configured to allow the wires to slide. As such, the contraction of the AF SMA wires in the horizontal (third) portion 440b promote translation of the lens 426 in the direction of the optical axis 402, for example the z direction, thus providing more stroke than the vertical sections (first portion 440a and second portion 440c) alone could provide.

The AF SMA wires 410a,b, when actuated, shorten to shift the bobbin 430 down or expand to shift the bobbin 430 up equally on all four corners and by using the tension of the bobbin spring 428 to further control the movement. The z-axis shift of the bobbin 430 translates into a z-axis shift of the attached lens 426 which performs the auto-focus function of the camera lens actuator. The AF SMA wires 410 a,b can have a diameter greater than the OIS SMA wires 408a-d since the AF assembly 422 operates at a slower frequency than the OIS assembly 424. For various embodiments, one focus wire attach structure of the pair is on each of the support structure and the moving structure, or both focus wire attach structures of the pair are on the support structure, or both focus wire attach structures of the pair are on the moving structure.

According to various embodiments, in order to minimize cost and complexity of the ground connection for the device, a common connection is made through the bearings 420 (e.g. ball or sliding bearings) and/or by electrically connecting the moving layer 412 to the FPC layer 404.

Can/Enclosure

Figure 11:
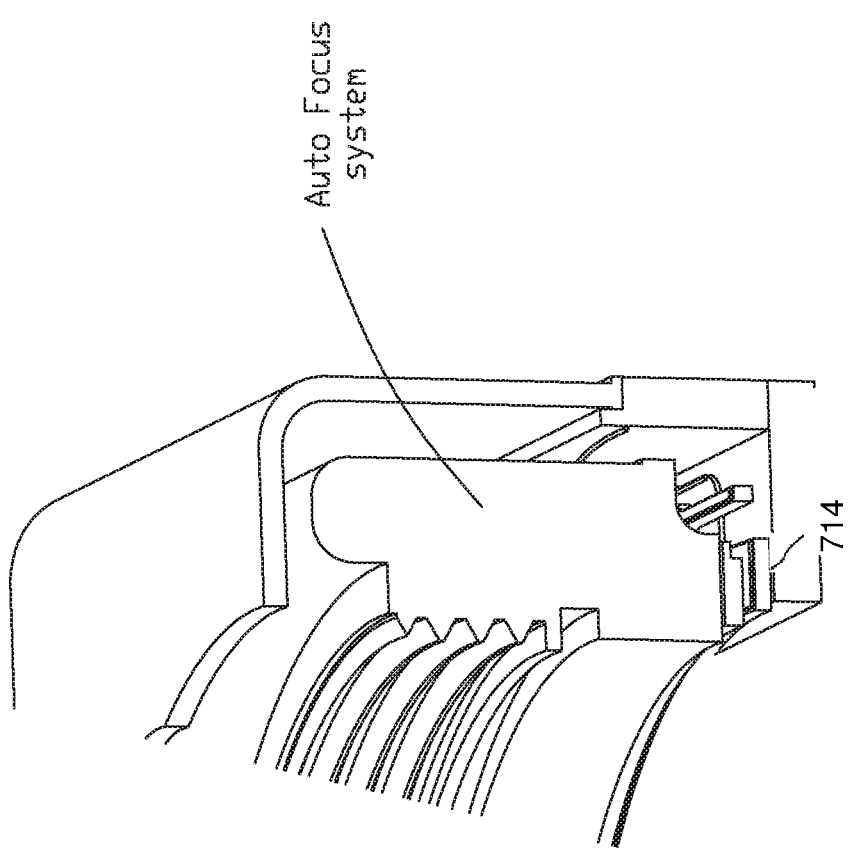
Figure 12:
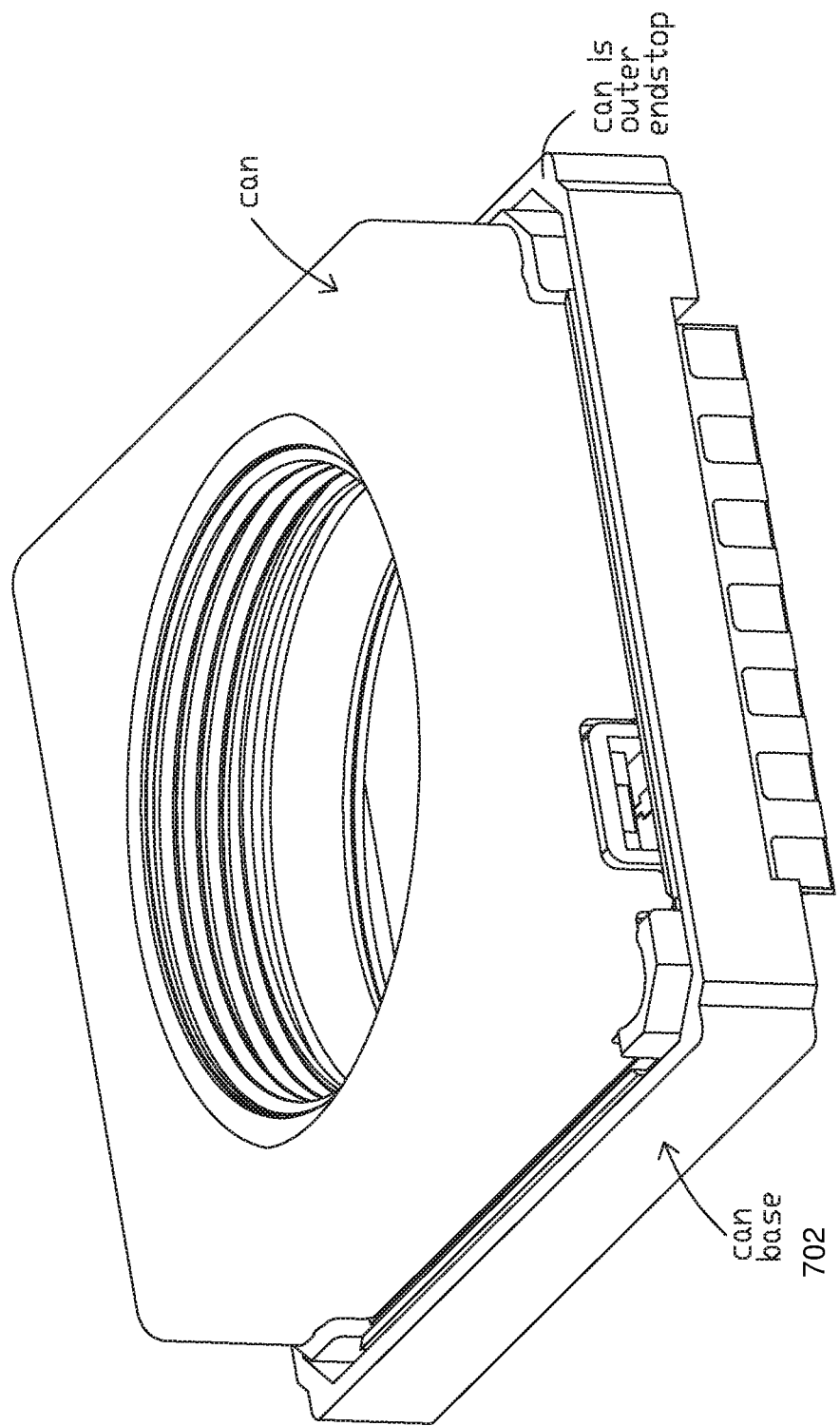
Figure 13:
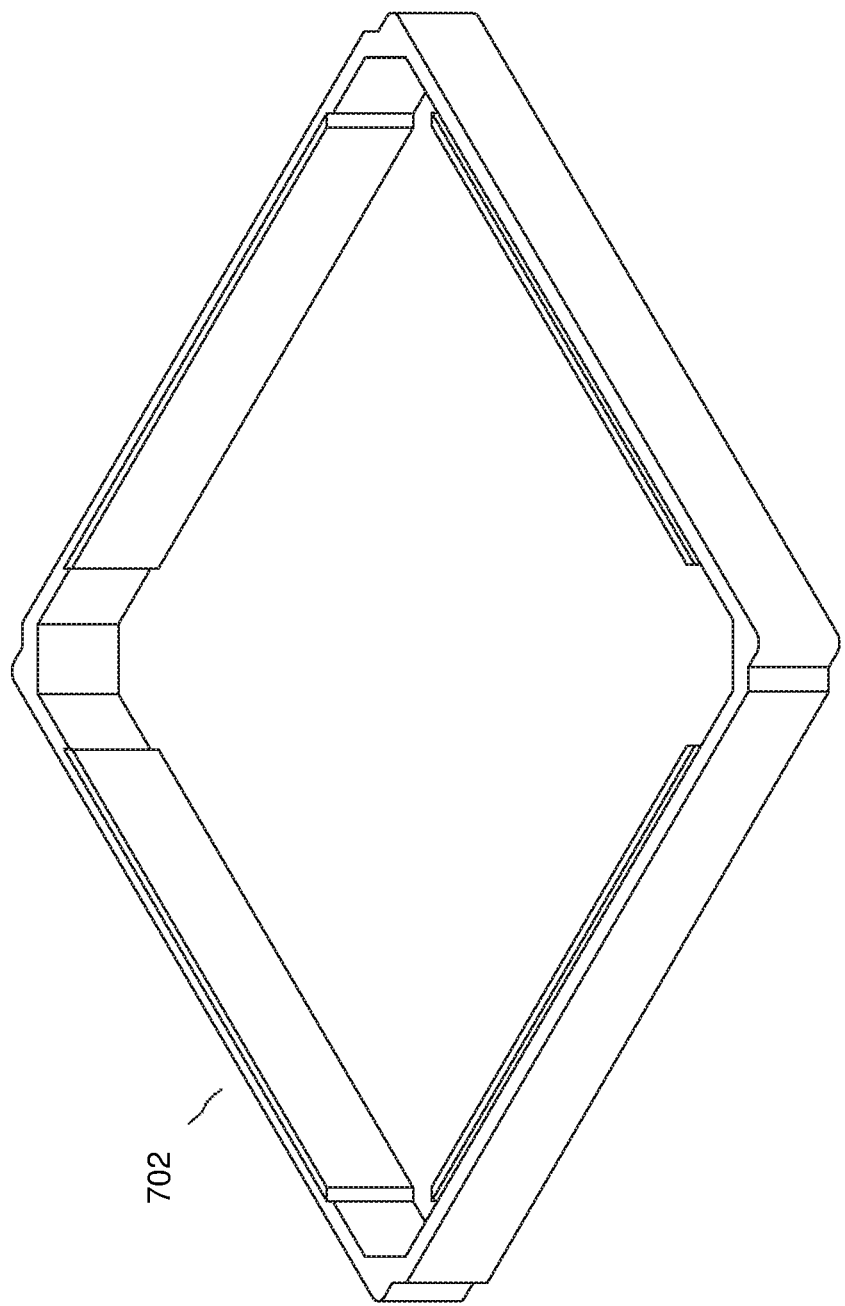
Figure 16:
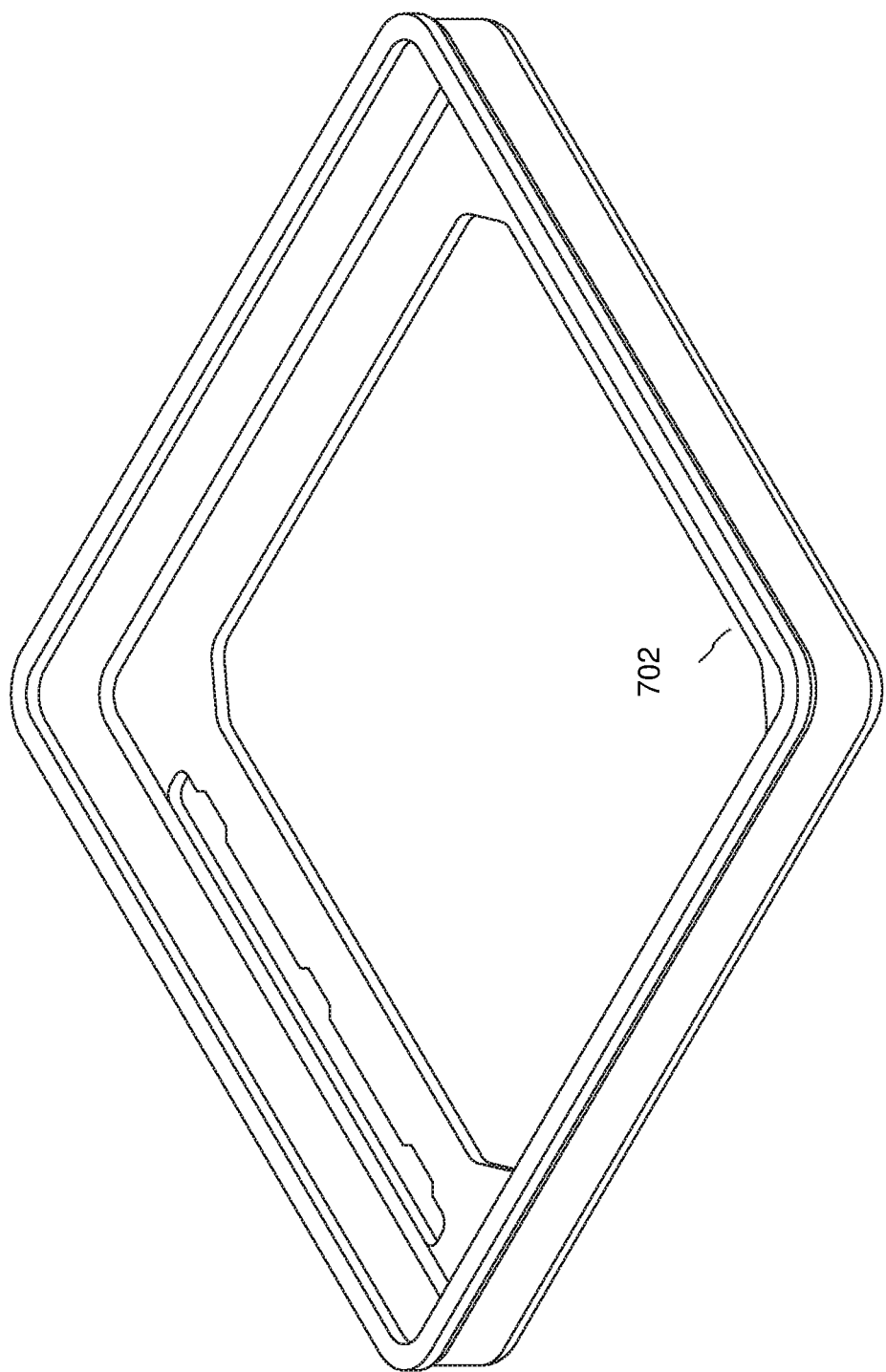
Figure 17:
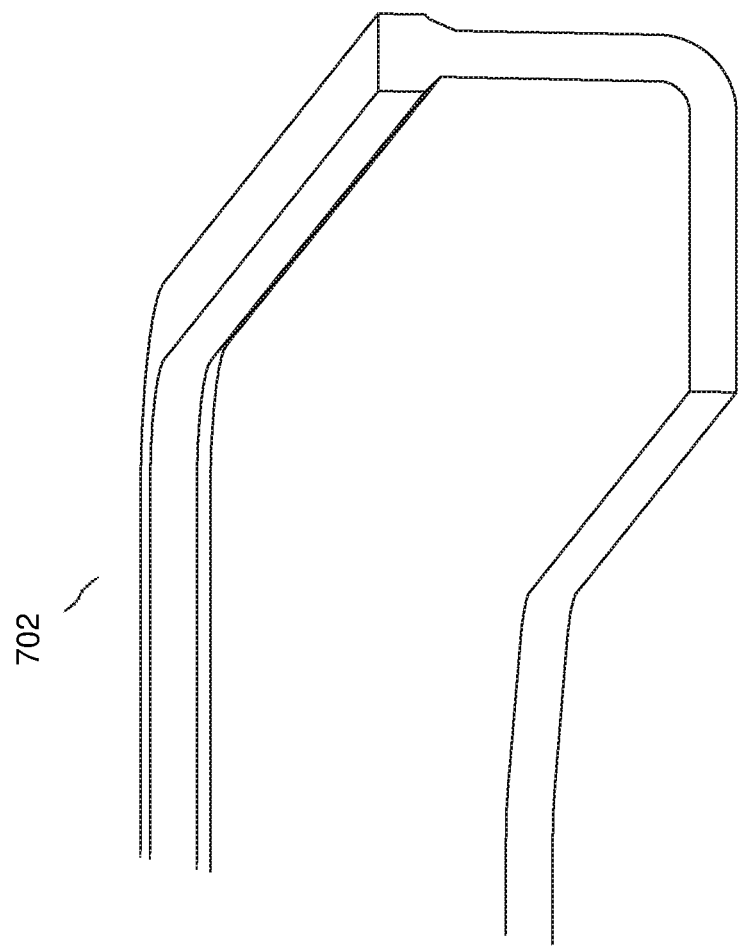
Figure 18:
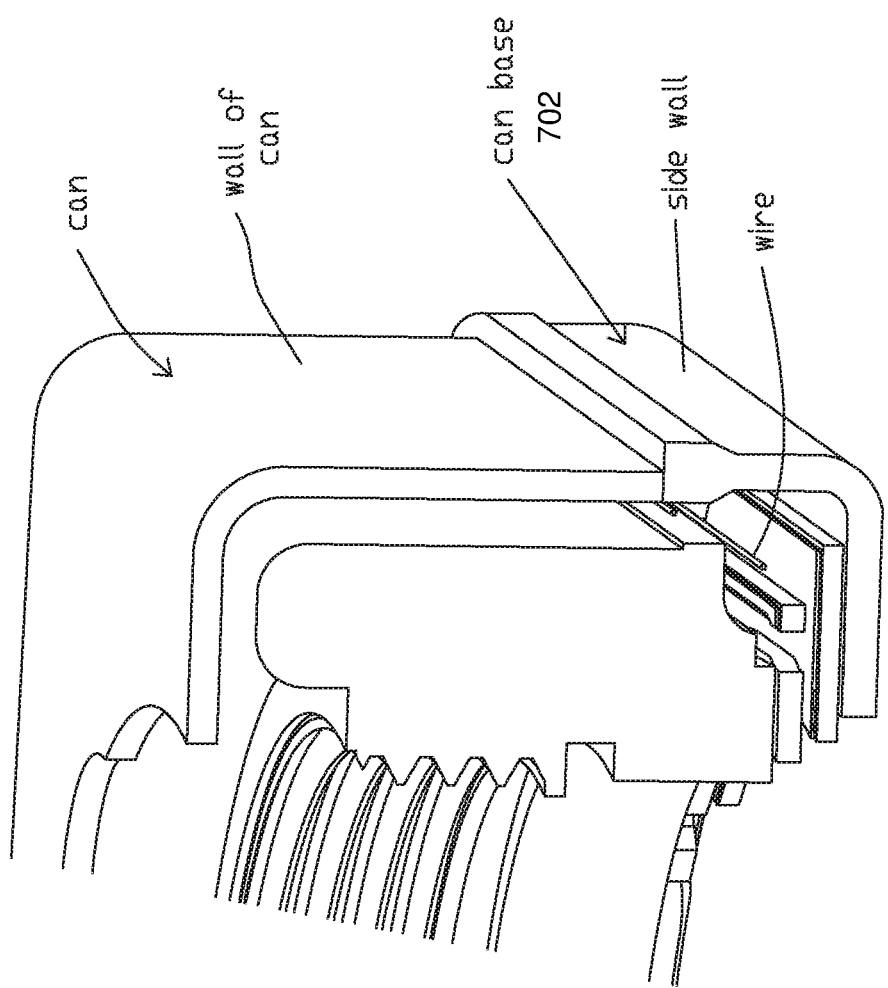
Figure 19:
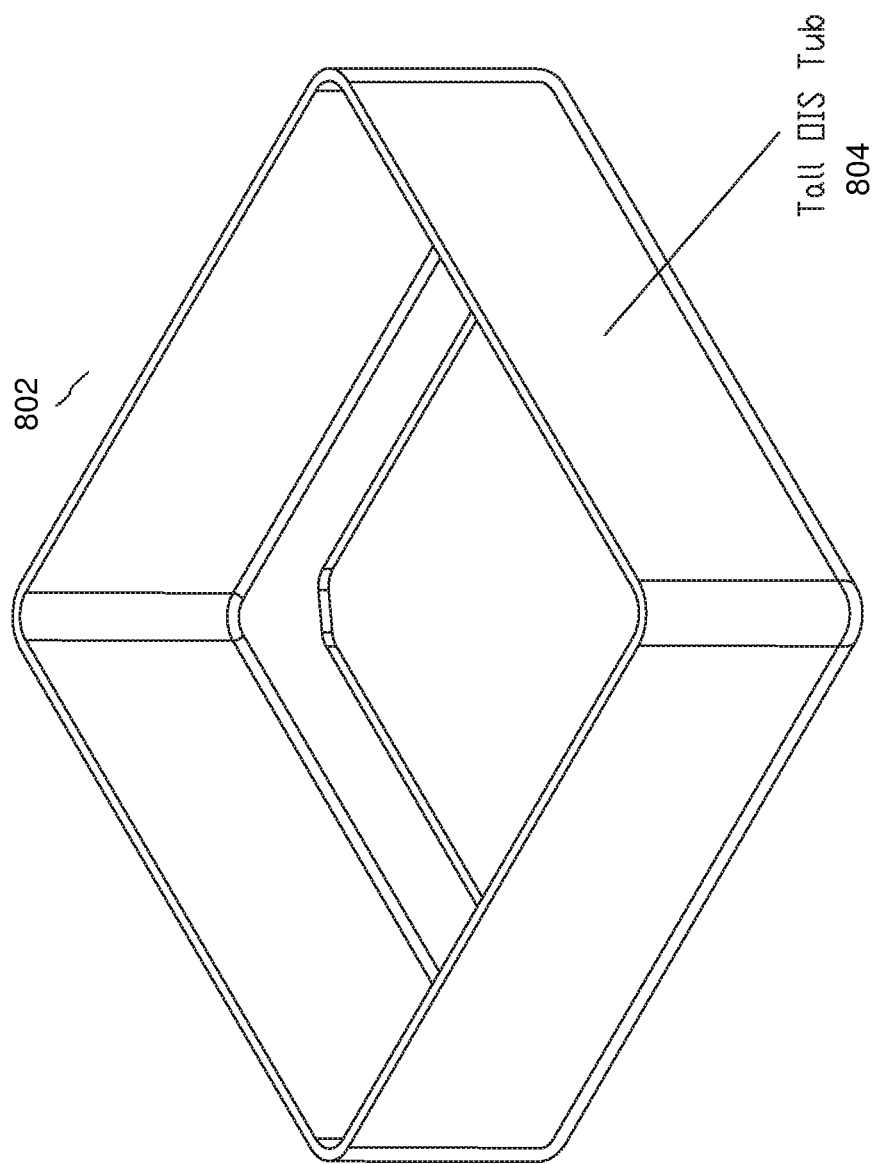
Figure 20:
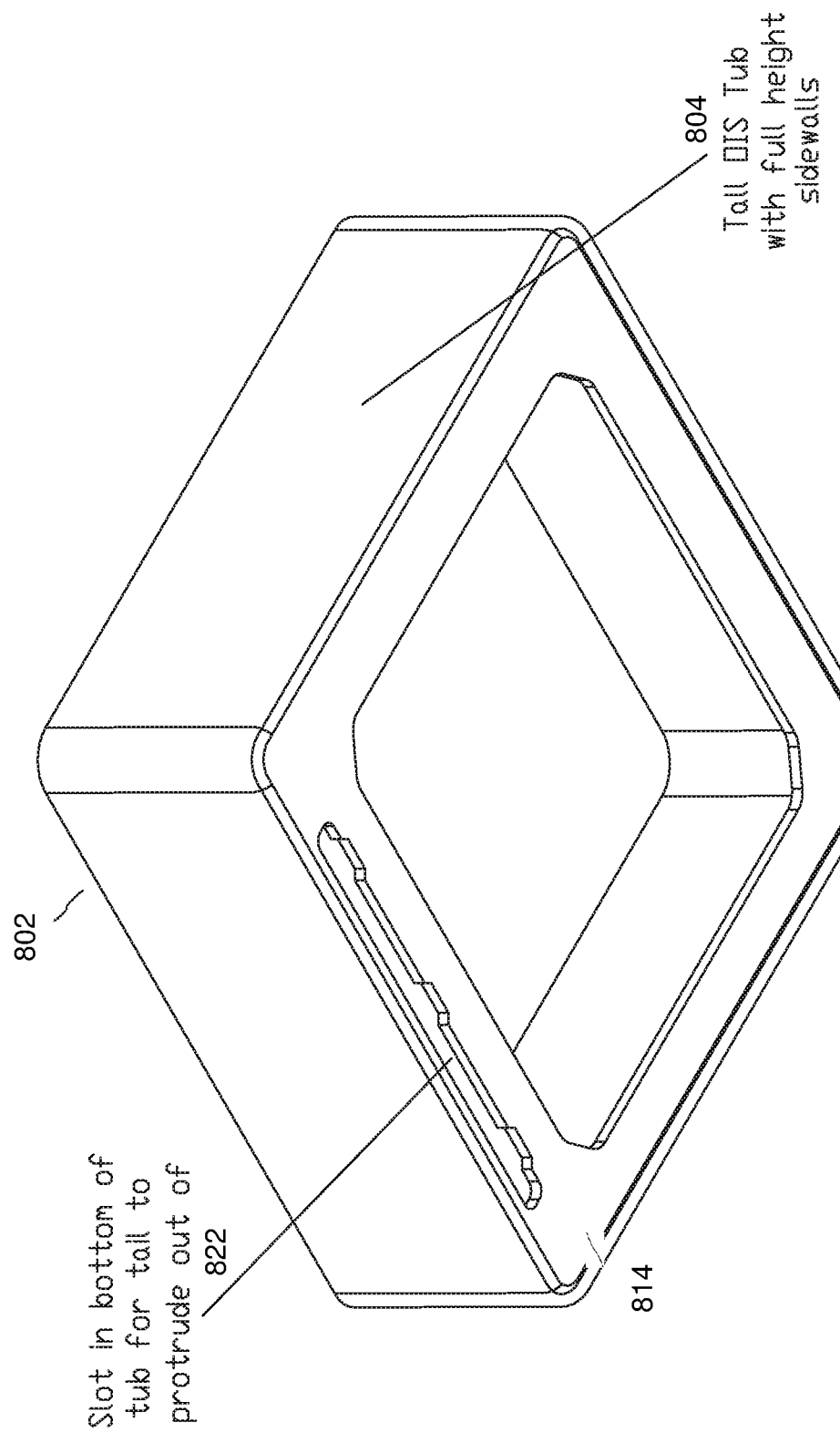
Figure 21:
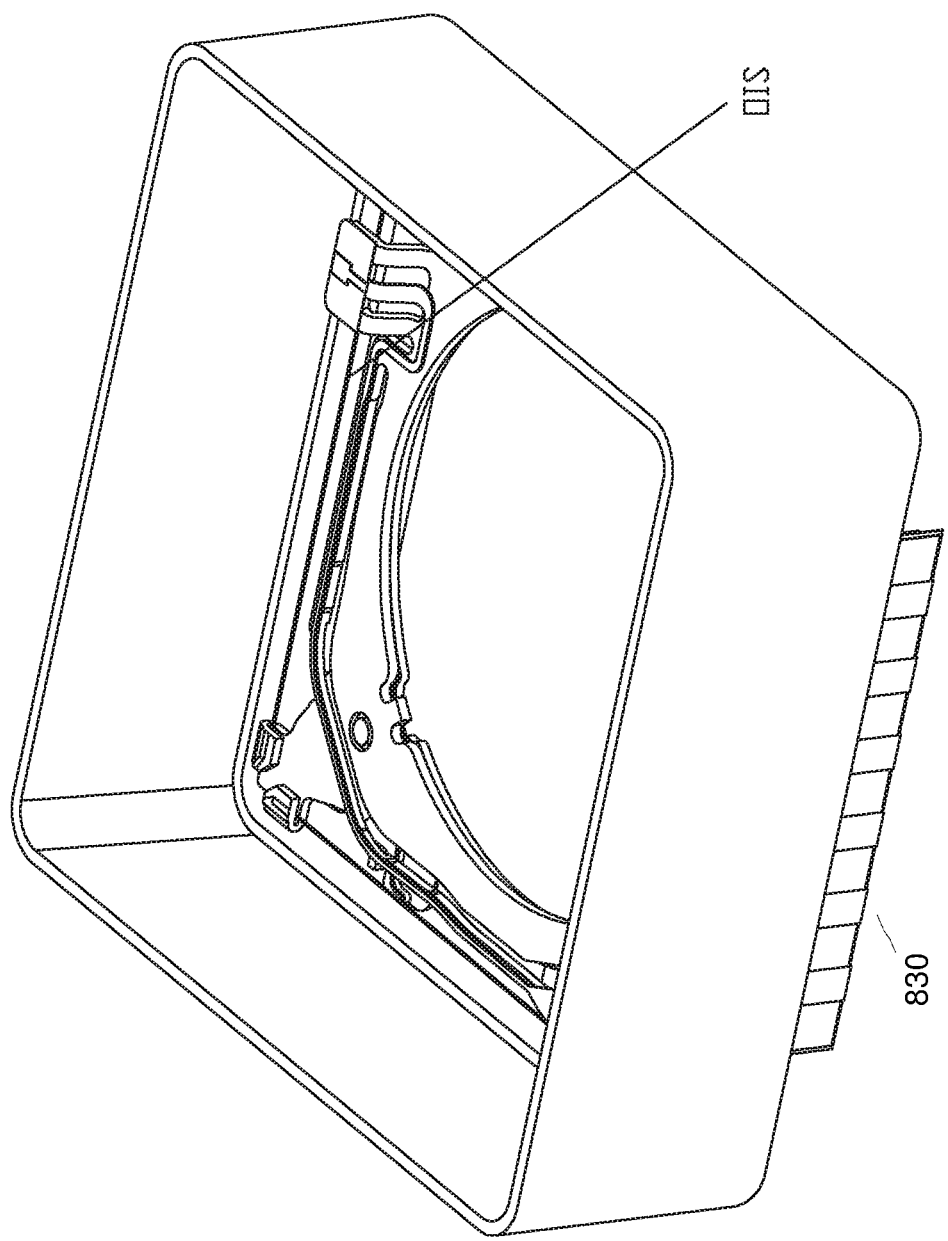
Figure 22:
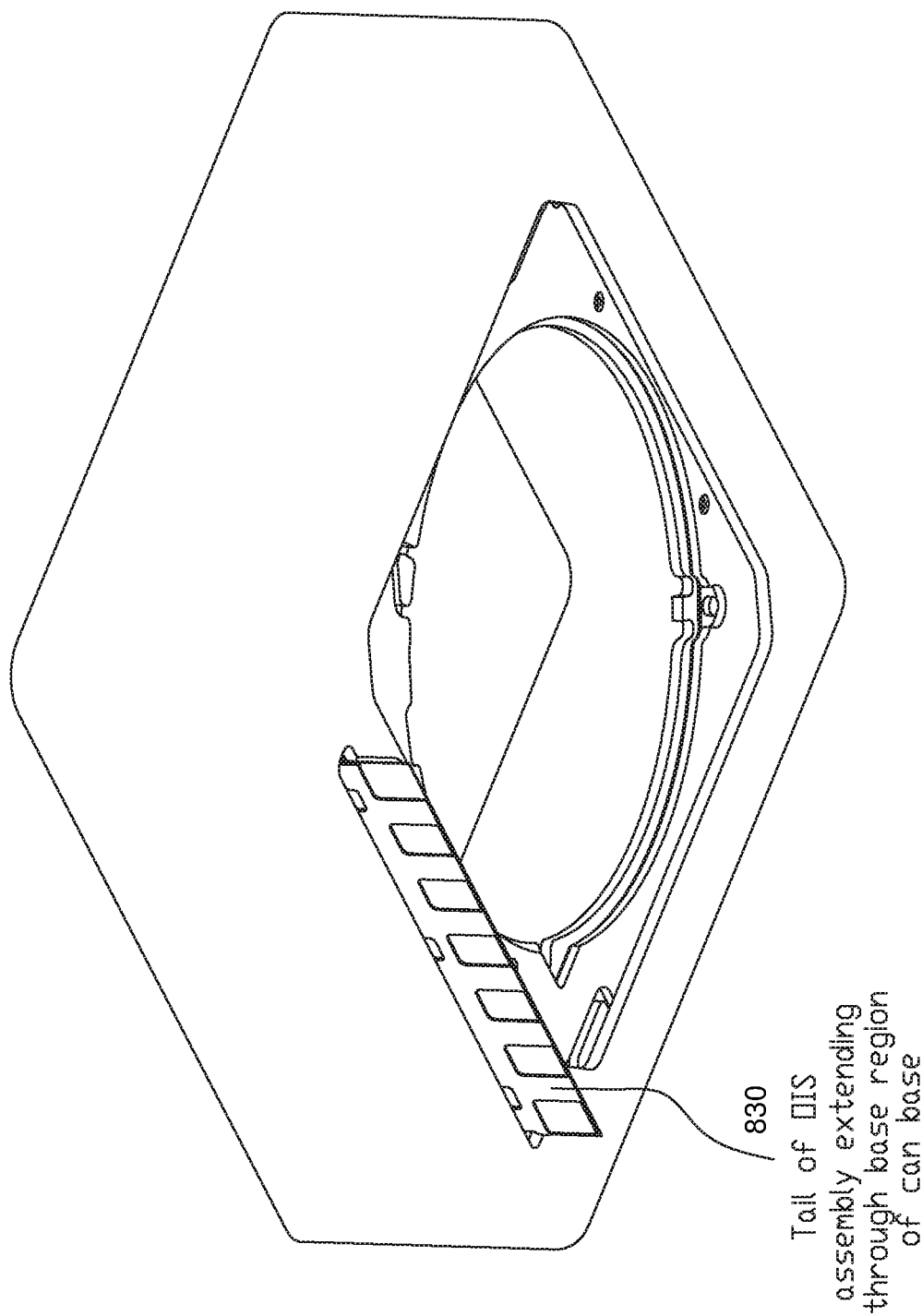
Figure 23:
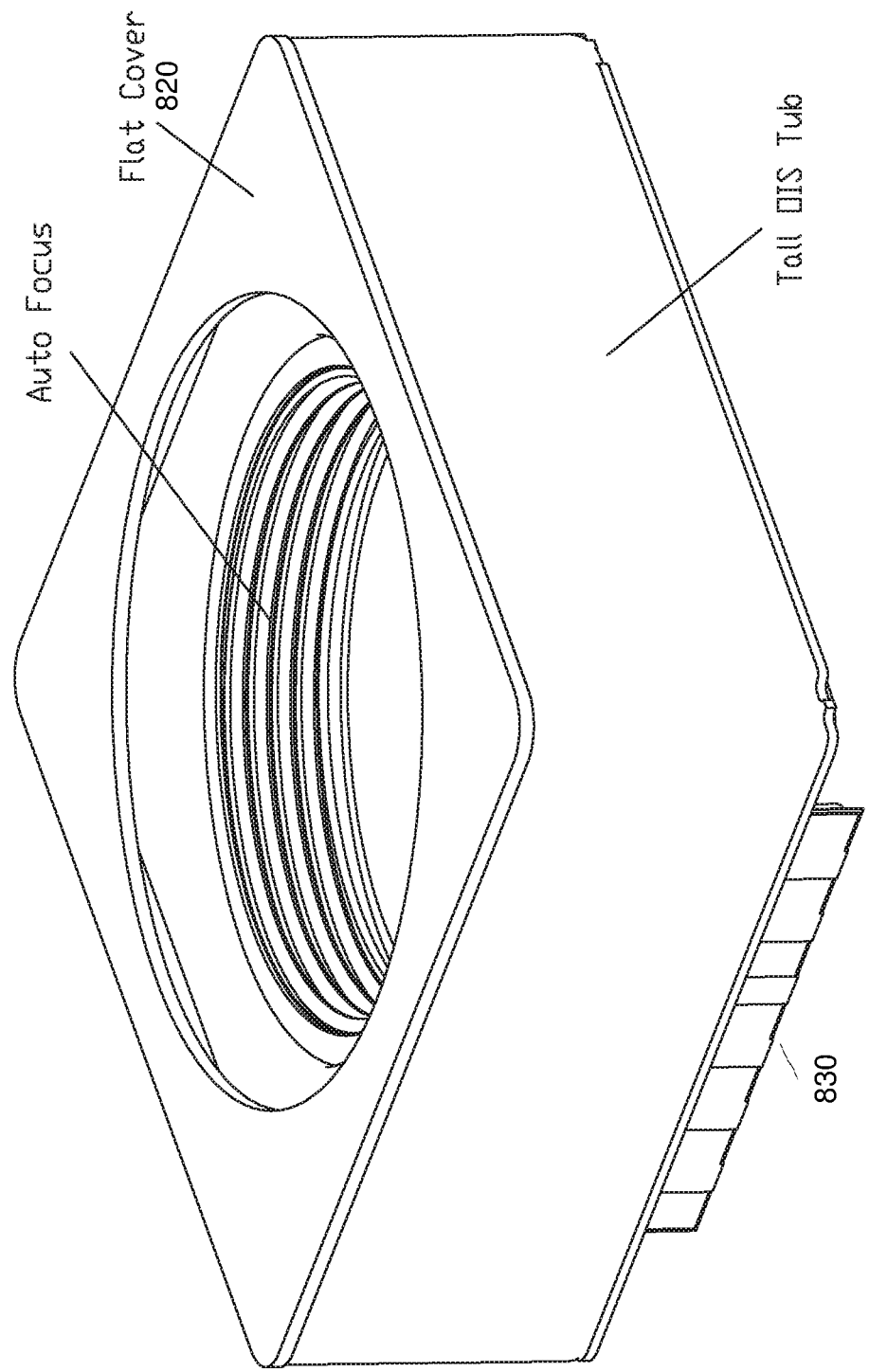
Figure 24:
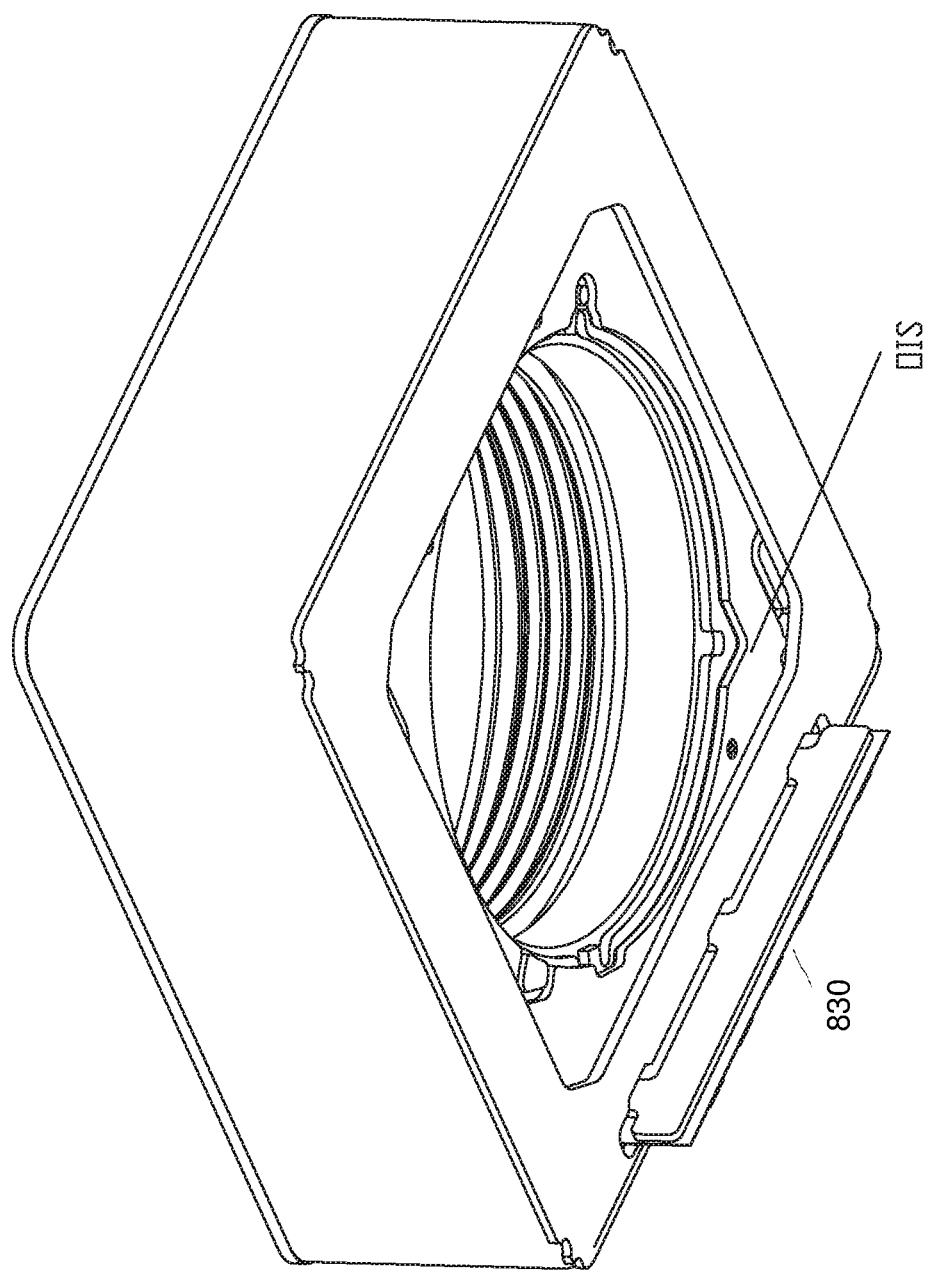
Figure 28:
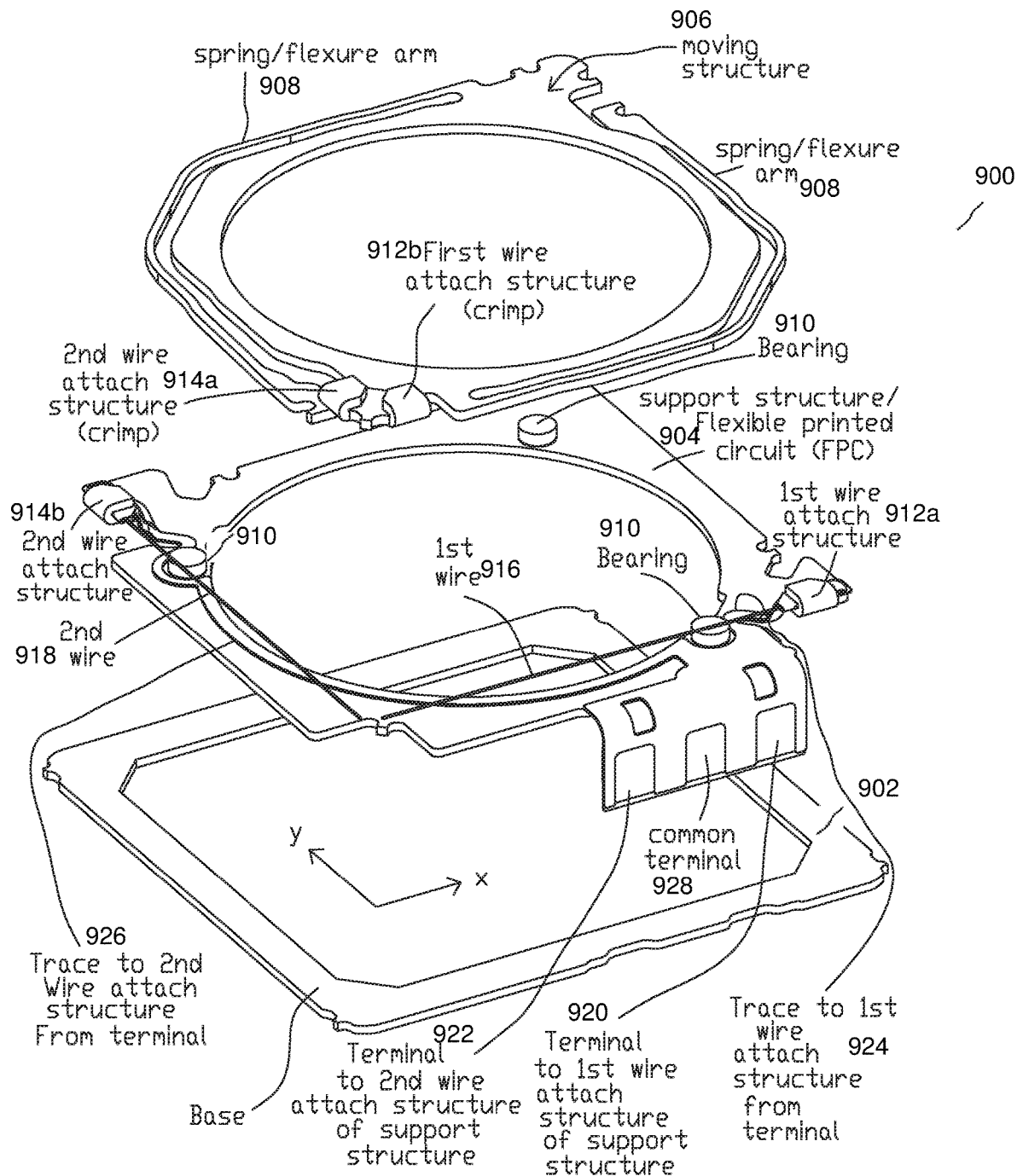
Figure 29:
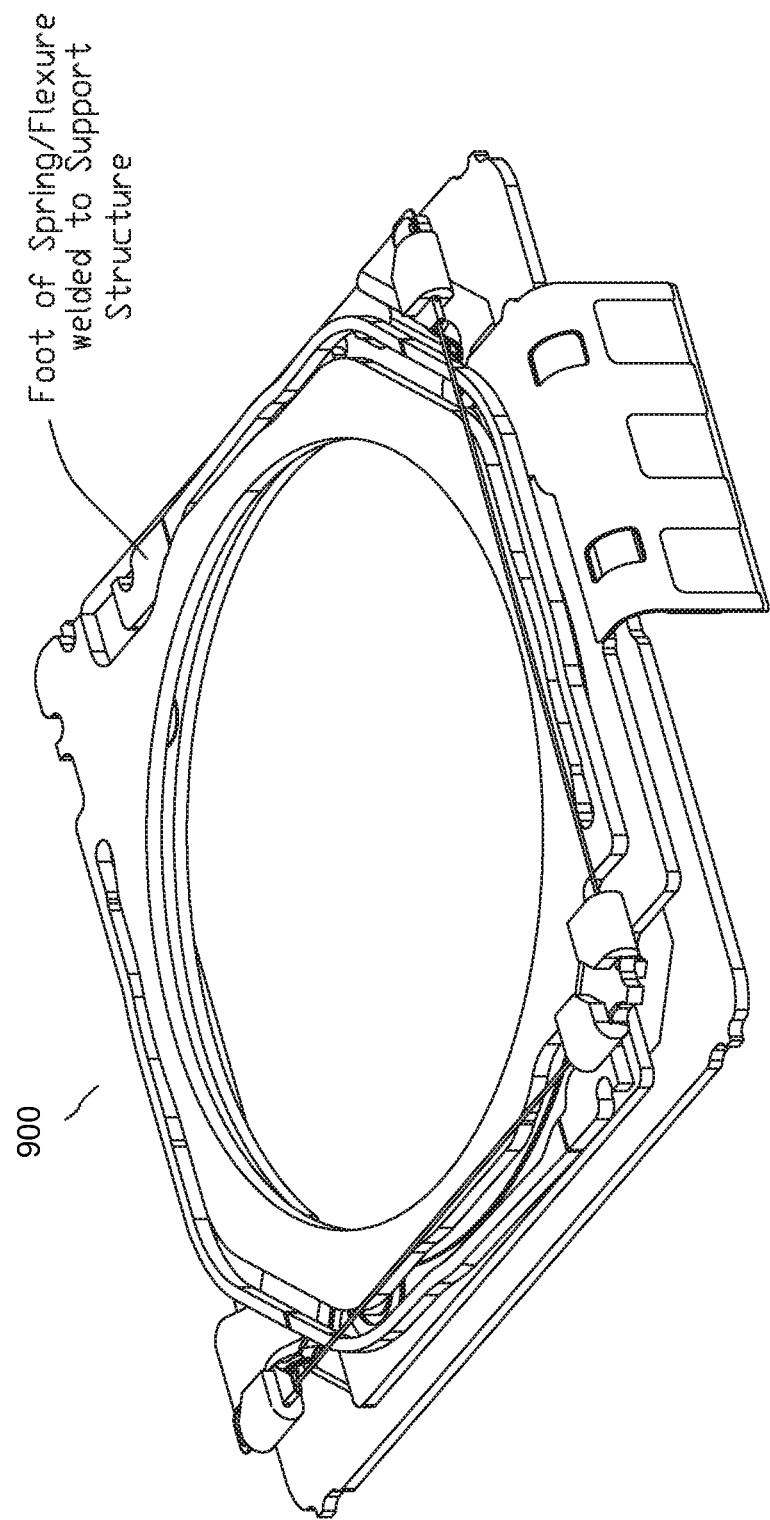
Figure 30:
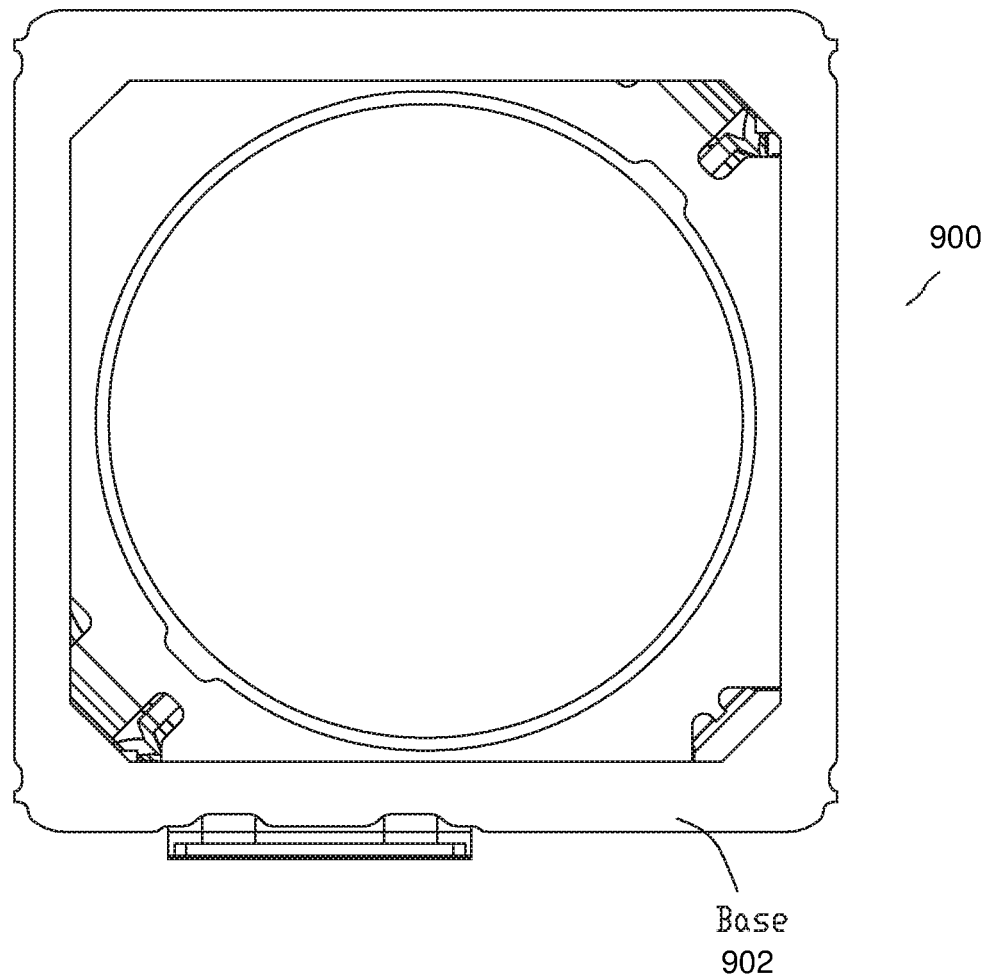

FIGS. 7-24 illustrate an OIS assembly including a screening can assembly and methods according to various embodiments. As shown, the support structure/moving structure assembly is positioned in a can base 702 or tub having sidewalls 704 that can constrain the baggy shape memory alloy wires, thereby reducing the risk of a baggy wire getting pinched or damaged during assembly. The can base 702 can, for example, be injection molded plastic or stamped metal. According to some embodiments, the can base 702 can replace a base layer 714 of the support structure by including a bottom 722. For example, FIGS. 7, 8, 9, 10, 12, and 16-24 illustrate various embodiments of a can base 702 that includes a bottom 722 configured to replace a base layer 714. FIG. 11 illustrates an embodiment of a can base 702 configured without a bottom 722 and including sidewalls 704 and used with an OIS assembly including a base layer 714. FIGS. 13-15 illustrate various views of an embodiment of the can base 702 illustrated in FIG. 11.

According to other embodiments, the can base 702 can be glued or otherwise attached to a base structure 714 of the support structure/moving structure assembly. The can base 702 can be attached to the support structure/moving structure assembly base before attaching the assembly to the OIS core or the assembly base. This approach can reduce the risk of baggy wires getting trapped since glue is already cured and the sidewalls 704 of the can base 702 are sufficiently tall to stay away from the screening can and glue. In embodiments, the sidewalls of the can base can be about 1 mm in height and about 0.3 mm in thickness. The structure has other dimensions in other embodiments. A lip on an upper edge, such as an inner lip, can aid in screening and can position tolerance and in shock robustness.

FIGS. 19-24 illustrate embodiments of a can base 802 including the sidewalls 804 of the can base 802 configured to be "full height" (e.g., at least as high as the structures such as the auto focus system and OIS that are enclosed by the can base). According to various embodiments the can screen 820 may be a flat cover that mates with upper edges of the full height sidewalls 804. FIGS. 20-24 illustrate embodiments include an opening such as a slot 822 through the base 814 or bottom wall of the can base. A tail of the OIS 830 having terminal pads can extend through the slot 822.

Advantages of the can base with sidewalls include the reduced risk of smart memory alloy wire pinch during the lens holder build process. It provides a limiter as the moving crimps will run into the can sidewall, making the assembly more robust to handling. It provides position tolerance, enabling more consistent control across lens holder builders with varied manual/automation tolerance capabilities. The risk of flexible printed circuit ("FPC")-to-OIS base electrical short risk is reduced when a plastic insulator is located between the screening can and the OIS base.

Furthermore, embodiments include a suspension assembly including a support structure including a first region (e.g., a bottom region) and one or more support wire attach structures, wherein each support wire attach structure is at a z-height with respect to the first region; a moving structure coupled to the support structure (e.g., on a first side of the first region) to form an assembly having sides, the moving structure including one or more moving wire attach structures, and wherein each moving wire attach structure is at a z-height with respect to the first region of the support structure; one or more shape memory alloy (SMA) wires, each wire coupled to and extending between one of the support wire attach structures and one of the moving wire attach structures along a side of the assembly; a can base including a side wall along one or more sides of the assembly having an extending shape memory alloy wire, wherein the assembly is or can be located in the can base, and wherein the can base has an opening defined by an edge of each side wall, and each side wall has a height that extends to a z-height with respect to the first region that is sufficient to confine the wire within the can base and reduce a possibility that the wire might otherwise extend over the edge of the sidewall. The suspension assembly may further including a can on the can base, the can having one or more side portions, and wherein each side portion engages a sidewall of the can base. Moreover, the suspension assembly may include a can base with a plurality of sidewalls (four in embodiments), and each sidewall optionally has the same height. Further, the suspension assembly may include a can with a plurality of side portions (four in embodiments), and each side portion engages a wall of the can base. The suspension assembly may also include can with one or more sidewalls. The suspension assembly may include each sidewall of the can base extending to a height that is at least as high as the z-height of the support wire attach structure. The suspension assembly may also include each sidewall of the can base extending to a height that is at least as high as the z-height of the moving wire attach structure. The suspension assembly may include each sidewall of the can base extending to a height that is equal to or greater than the z-heights of both the support wire attach structure and the moving wire attach structure. The suspension assembly may include the can base having a base region, and wherein the sidewalls extend from the base region. The suspension assembly may also include one or more of the sidewalls of the can base including a lip to engage the can. The suspension assembly may include a tail having terminals and the base region of the can base including an opening (optionally a slot) through which the tail of the assembly extends. The suspension assembly including each sidewall of the can base is a full height side wall; and the can is a generally flat cover.

A method for assembling a suspension, according to an embodiment, includes: providing an assembly having sides, including: a support structure including a first region (e.g., a bottom region) and one or more support wire attach structures; a moving structure coupled to the support structure (e.g., on a first side of the first region), the moving structure including one or more moving wire attach structures; and one or more shape memory alloy wires, each wire coupled to and extending between one of the support wire attach structures and one of the moving wire attach structures along a side of the assembly; providing a can base including a side wall associated with at least each side of the assembly having an extending shape memory alloy wire; and positioning the assembly in the can base and constraining each shape memory alloy wire within the can base by the associated side wall. The method further includes: providing a can having one or more side portions (and optionally side walls); and mounting the can to the can base, including engaging each side portion of the can with an associated side wall of the can base while the associated shape memory alloy wire is constrained by the can base.

Two-Wire OIS

FIGS. 25-30 illustrate a two-wire camera lens optical image stabilization ("OIS") suspension assembly 900 according to various embodiments. As shown, the suspension assembly includes a base component 902, a support structure 904 such as a static crimp/flexible printed circuit ("FPC") and a moving structure 906 such as a moving crimp/spring component. The moving structure 906 includes spring arms 908 or flexures that are coupled to the support structure 904 and enable movement of the moving structure 906 with respect to the support structure 904. According to embodiments, two spring arms 908 are used. Bearings 910 such as low friction slide pads or ball bearings support a portion of the moving structure 906 with respect to the support structure 904. The flexure arms 908 bias the moving structure 906 to a neutral position or spring center with respect to the support structure 904. First wire attach structures 912 *a,b* and second wire attach structures 914*a,b* are on each of the support structure and the moving structure. For various embodiments, the first and second wire attach structures are crimps. A first shape memory alloy wire 916 is connected to the first wire attach structures 912*a,b* of the support structure 904 and the moving structures 906, and extends along a first axis, for example an x axis. A second shape memory alloy wire 918 is connected to the second wire attach structures 914*a,b* of the support structure 904 and moving structure 906, and extends along a second axis, for example a y axis. The illustrated embodiment includes only two shape memory alloy wires and associated wire attach structures.

According to various embodiments, the first wire attach structure 912a on the support structure 904 is electrically coupled with a first terminal 920 through a first trace 924. According to various embodiments, the second wire attach structure 914b on the support structure 904 is electrically coupled with a second terminal 922 through a second trace 926. The first wire attach structure 912b and the second wire attach structure 914a on the moving structure 906 is electrically coupled with a common terminal 928 through one or more of the flexure arms 908. According to some embodiments, the common terminal 928 is coupled with ground. By applying power to the first SMA wire 916, the wire can be heated, thereby contracting the wire and causing the moving member to move in one direction about, for example about the x axis, from the neutral position. The amount of power applied to the first SMA wire 916, and thereby the amount that the first SMA wire 916 is heated, can be controlled or regulated to control the amount or distance of movement of the moving member about the x axis. Similarly, by applying power to the second SMA wire 918, the wire can be heated, thereby contracting the wire and causing the moving member to move in one direction, for example about the y axis, from the neutral position. The amount of power applied to the second SMA wire 918, and thereby the amount that the second SMA wire 918 is heated, can be controlled to control the amount or distance of movement of the moving structure 906 about the y axis.

Figure 32:
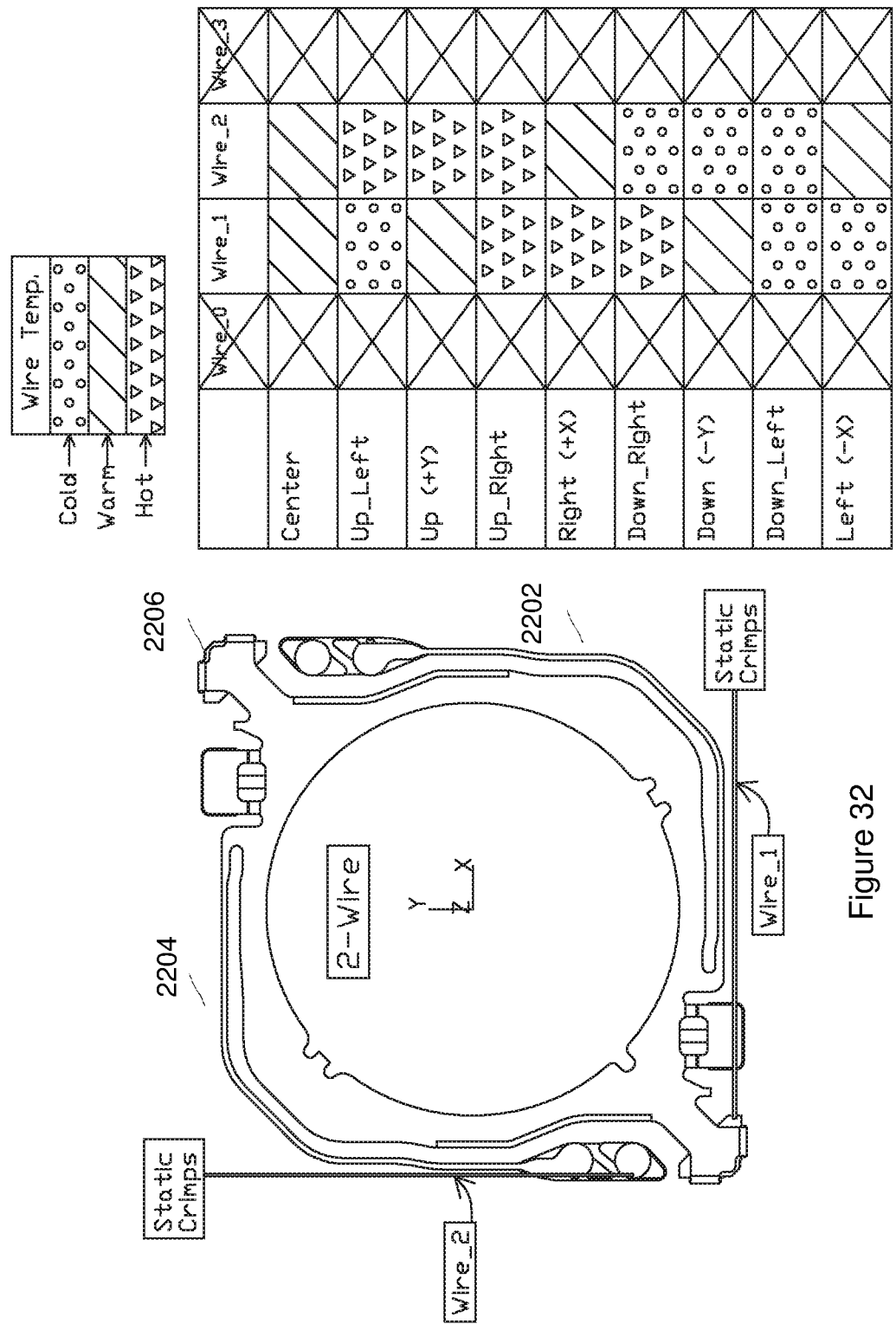
FIG. 32 illustrates the operation or actuation of the suspension assembly according to an embodiment with a chart.

FIGS. 31A-31E and the chart of FIG. 32 illustrate the operation or actuation of the suspension assembly according to various embodiments. Power is applied to both the first SMA wire 2202 and second SMA wires 2204 to move or bias the moving member 2206 from its neutral position (i.e., spring center) to the center of its operating range (i.e., the power center). In effect, by regulating or controllably applying power to the first SMA wire 2202 and second SMA wire 2204, the moving member 2206 can be positioned at a range of locations within one quadrant of a cartesian coordinate system where the neutral position corresponds to the origin of the coordinate system.

The two-wire suspension can use less wire than prior art 4-wire suspensions because of the lesser number of wires needed and also because there is reduced need for a "extra" wire to provide slack between associated crimps (i.e., because the suspension starts its range of motion from the corner and the wires need not lengthen). The reduced amount of wire offers advantages by alleviating problems that can arise with prior art suspensions. For example, extra wire leads to manufacturing issues when attaching the screening can to the OIS base because the extra wire can become trapped or pinched under the can. Extra wire also has more opportunity to become damaged during shock while striking other components inside the camera. Other advantages include lower cost though smaller bill of materials and fewer process steps, smaller footprint since the need for wire clearance zones is reduced, ease of lens holder build and fewer electrical terminals.

An embodiment includes a suspension assembly that includes: a support structure having a first and second wire attach structures (e.g., static crimps); a moving structure having first and second wire attach structures (e.g., moving crimps); one or more spring or flexure arms coupling the support structure to the moving structure, wherein the flexure arms enable movement of the moving structure with respect to the support structure about x and y axes, and bias the moving structure to a neutral x,y location about the x and y axes with respect to the support structure (e.g., the moving structure and flexure arms collectively a flexible printed circuit (FPC)); first and second shape memory alloy wires, the first wire coupled to the first wire attach structures of the support and moving structures and extending about a first axis, and the second wire coupled to the second wire attach structures of the support and moving structures and extending about a second axis that is non-parallel to the first axis; and wherein the suspension assembly is configured such that by the application of electrical power to the first wire the moving member can be moved over a range of locations about the x axis on only one side of the neutral location, and by the application of electrical power to the second wire the moving member can be moved over a range of locations about the y axis on only one side of the neutral location (e.g., over one quadrant with respect to the origin in an xy coordinate system). The suspension assembly may also include only two smart memory alloy wires (i.e., only the first and second wires). The suspension assembly may also include the first and second wires extend about generally perpendicular (e.g., x and y) axes. The suspension assembly may also include the first and second wire attach structures on the moving member are adjacent one another. The suspension assembly may also include the first wire attach structure of the support structure is spaced from the first wire attach structure of the moving structure about the x axis, and the second wire attach structure of the support structure is spaced from the second wire attach structure of the moving structure about the y axis.

A method for actuating the suspension assembly, according to an embodiment, such as those described herein includes: applying a first amount of power to the first wire to cause the first wire to have a first temperature (e.g., relatively cold), to locate the moving structure at a first distance from the neutral location about the x axis; applying a first amount of power to the second wire to cause the second wire to have a first temperature (e.g., relatively cold), to locate the moving structure at a first distance from the neutral location about the y axis; applying a second amount of power that is greater than the first amount of power to the first wire to cause the first wire to have a second temperature that is greater than the first temperature (e.g., relatively warm), to locate the moving structure at a second distance that is greater than the first distance from the neutral location about the x axis; applying a second amount of power that is greater than the first amount of power to the second wire to cause the second wire to have a second temperature that is greater than the first temperature (e.g., relatively warm), to locate the moving structure at a second distance that is greater than the first distance from the neutral location about the y axis; applying a third amount of power that is greater than the second amount of power to the first wire to cause the first wire to have a third temperature that is greater than the second temperature (e.g., relatively hot), to locate the moving structure at a third distance that is greater than the second distance from the neutral location about the x axis; and applying a third amount of power that is greater than the second amount of power to the second wire to cause the second wire to have a third temperature that is greater than the second temperature (e.g., relatively hot), to locate the moving structure at a third distance that is greater than the second distance from the neutral location about the y axis.

Individual features and the overall functionality of embodiments described above can be combined with each other. Other features of suspension assemblies that can be incorporated into the embodiments of the invention described above are described in commonly assigned U.S. patent application Ser. No. 14/951,573, filed Nov. 25, 2015 and entitled Integrated Camera Lens Suspension, which is incorporated herein by reference in its entirety and for all purposes.

Various modifications and additions can be made to the exemplary embodiments discussed without departing from the scope of the present invention. For example, while the embodiments described above refer to particular features, the scope of embodiments described herein also includes embodiments having different combinations of features and embodiments that do not include all of the described features. Accordingly, the scope of the embodiments is intended to embrace all such alternatives, modifications, and variations as fall within the scope of the claims, together with all equivalents thereof. While the disclosed subject matter is amenable to various modifications and alternative forms, specific embodiments have been shown by way of example in the drawings and are described herein. The intention, however, is not to limit the disclosure to the particular embodiments described. On the contrary, the disclosure is intended to cover all modifications, equivalents, and alternatives falling within the scope of the disclosure as defined by the appended claims.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

What is claimed is:

1. A suspension assembly comprising:
a support structure configured as a one-piece layer, the support structure including one or more support wire attach structures;
a moving structure configured as a one-piece layer, the moving structure including one or more moving wire attach structures;
one or more flexure arms in the moving structure configured as the one-piece layer, the one or more flexure arms configured to couple the moving structure to the support structure, wherein the flexure arms are configured to enable movement of the moving structure with respect to the support structure;
one or more optical-image stabilizer shape memory alloy wires, each of the one or more optical-image stabilizer shape memory wires coupled with and extending between one of the support wire attach structures and one of the moving wire attach structures;
a lens holder movably mounted to the moving structure;
at least a first pair of auto focus shape memory alloy wire attach structures; and
one or more auto focus shape memory alloy wires, each auto focus shape memory alloy wire coupled to the lens holder and coupled to and extending between the auto focus wire attach structures of one of the at least first pair of auto focus wire attach structures configured to actuate the lens holder with respect to the moving structure.

2. The suspension assembly of claim 1 wherein each auto focus wire attach structure of the at least first pair is on either the support structure or the moving structure.

3. The suspension assembly of claim 1 wherein:
lens holder has side portions and an intermediate portion between the side portions; and
one or more of the focus wires extends along and optionally across both side portions of the lens holder and extends along and optionally across the intermediate portion of the lens holder.

4. The suspension assembly of claim 1 and further including one or more hook structures on the lens holder to guide movement of each focus wire.

5. The suspension assembly of claim 1 and further including:
a housing mounted to the moving structure and configured to hold the lens holder for image focusing;
a spring to bias the lens holder in the housing; and
wherein each focus wire is engaged with the lens holder.

6. The suspension assembly of claim 1 and further including:
a plurality of terminal pads; and
an electrical lead coupling each support wire attach structure, each moving wire attach structure and each focus wire attach structure to one of the terminal pads.

7. The suspension assembly of claim 1 wherein one or more of the at least one focus wire has a diameter that is greater than a diameter of one or more of the at least one image stabilization wire.

8. The suspension assembly of claim 1 and further including one or more channels in the lens holder, each channel guiding one of the one or more focus wires.

9. The suspension assembly of claim 3 wherein one or more of the focus wires includes a portion having a length extending along the intermediate portion of the lens holder and a portion having a length extending along a side portion of the lens holder, and wherein the length of the focus wire portion extending along the intermediate portion of the lens holder is longer than the length of the focus wire portion extending along the side portion of the lens holder.

10. The suspension assembly of claim 3 and further including one or more hook structures to guide one or more of the SMA wires.

11. The suspension assembly of claim 5 wherein:
the spring biases the lens holder in a direction away from the moving member; and
each focus wire is configured to move the lens holder toward the moving member against the bias of the spring when electrical power is applied to the focus wire.

12. The suspension assembly of claim 9 wherein angles between the portions of the focus wire extending along the side portions of the lens holder and the portion of the focus wire extending along the intermediate portion of the lens holder are about 90° or greater.

13. The suspension assembly of claim 10 wherein one or more of the hook structures is on the lens holder adjacent an intersection of one of the side portions and the intermediate portion.

* * * * *